(12) United States Patent
Shin et al.

(10) Patent No.: US 11,023,060 B2
(45) Date of Patent: Jun. 1, 2021

(54) DISPLAY DEVICE

(71) Applicant: LG DISPLAY CO., LTD., Seoul (KR)

(72) Inventors: SeungHwan Shin, Jeonju-si (KR); YoungMin Jeong, Paju-si (KR); Daeyoung Seo, Paju-si (KR); Soyoung Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 77 days.

(21) Appl. No.: 16/223,025

(22) Filed: Dec. 17, 2018

(65) Prior Publication Data
US 2019/0204972 A1 Jul. 4, 2019

(30) Foreign Application Priority Data

Dec. 29, 2017 (KR) .......................... 10-2017-0184245

(51) Int. Cl.
*G06F 3/041* (2006.01)
*G06F 3/042* (2006.01)
*G06F 3/044* (2006.01)
*G06F 3/047* (2006.01)
(Continued)

(52) U.S. Cl.
CPC ........ *G06F 3/0412* (2013.01); *G02F 1/13338* (2013.01); *G02F 1/136286* (2013.01); *G06F 3/042* (2013.01); *G06F 3/044* (2013.01); *G06F 3/047* (2013.01); *G06F 3/0416* (2013.01); *G06F 3/0443* (2019.05); *G06F 3/0446* (2019.05); *G02F 2201/121* (2013.01); *G02F 2201/123* (2013.01); *G06F 2203/04104* (2013.01); *G06F 2203/04106* (2013.01)

(58) Field of Classification Search
CPC .... G06F 3/0412; G06F 3/0446; G06F 3/0443; G06F 3/042; G06F 3/044; G06F 3/047; G02F 1/13338; G02F 1/0416; G02F 2201/121; G02F 2201/123; G02F 2203/04104; G02F 2203/04106
See application file for complete search history.

(56) References Cited

U.S. PATENT DOCUMENTS

| 9,715,315 | B2* | 7/2017 | Jun | G06F 3/0412 |
| 9,939,938 | B2* | 4/2018 | Qin | G06F 3/0446 |
| 10,452,189 | B2* | 10/2019 | Mizuhashi | G06F 3/0416 |

(Continued)

FOREIGN PATENT DOCUMENTS

KR 20110051610 A 5/2011

OTHER PUBLICATIONS

Combined Search and Examination Report issued in GB Application No. 1820798.5 dated Jun. 3, 2019.

*Primary Examiner* — Sejoon Ahn
(74) *Attorney, Agent, or Firm* — Polsinelli PC

(57) ABSTRACT

A display device having an open area and a non-open area surrounding the open area includes a pixel electrode and a common electrode disposed in the open area; a gate line disposed to extend in a first direction in the non-open area surrounding the open area and transmitting a gate signal to the pixel electrode; a data line disposed to extend in a second direction in the non-open area and transmitting a data signal to the pixel electrode; a plurality of sensing lines disposed in the non-open area and transmitting a common voltage or a touch scan signal to the common electrode; and a photo touch sensor disposed in the non-open area and electrically connected to one of the plurality of sensing lines.

19 Claims, 17 Drawing Sheets

(51) Int. Cl.
*G02F 1/1333* (2006.01)
*G02F 1/1362* (2006.01)

(56) References Cited

U.S. PATENT DOCUMENTS

| | | | |
|---|---|---|---|
| 2005/0094063 A1* | 5/2005 | Lee | G02F 1/133512 349/110 |
| 2008/0259051 A1* | 10/2008 | Ota | G06F 3/0412 345/175 |
| 2009/0002312 A1* | 1/2009 | Son | G06F 3/0412 345/104 |
| 2009/0078972 A1* | 3/2009 | Hwang | H01L 27/14601 257/290 |
| 2010/0001973 A1* | 1/2010 | Hotelling | G06F 3/04166 345/174 |
| 2010/0020029 A1* | 1/2010 | Park | G06F 3/0412 345/173 |
| 2010/0194697 A1* | 8/2010 | Hotelling | G06F 3/0446 345/173 |
| 2011/0096023 A1* | 4/2011 | Shih | G06F 3/0418 345/174 |
| 2011/0134070 A1* | 6/2011 | Wang | G06F 3/041 345/174 |
| 2011/0234536 A1* | 9/2011 | Yeo | G02F 1/13338 345/175 |
| 2012/0086879 A1* | 4/2012 | Yu | G06F 3/0412 349/33 |
| 2013/0075799 A1* | 3/2013 | Oyamada | H01L 27/1255 257/296 |
| 2013/0076691 A1* | 3/2013 | Liu | G06F 3/046 345/174 |
| 2013/0342781 A1* | 12/2013 | Lee | G02F 1/13394 349/46 |
| 2015/0042600 A1* | 2/2015 | Lukanc | G06F 3/0443 345/174 |
| 2015/0129877 A1* | 5/2015 | Cho | H01L 27/127 257/59 |
| 2016/0291774 A1* | 10/2016 | Jin | G06F 3/0416 |
| 2016/0306224 A1* | 10/2016 | Ishikawa | G02F 1/133528 |
| 2017/0102797 A1* | 4/2017 | Cok | G06F 3/0445 |
| 2017/0115811 A1 | 4/2017 | Yang et al. | |
| 2017/0329442 A1* | 11/2017 | Wang | G06F 3/0443 |
| 2019/0369772 A1* | 12/2019 | Yun | G06F 3/0412 |

* cited by examiner

DISPLAY DEVICE

CROSS REFERENCE TO RELATED APPLICATION

This application claims the priority of Korean Patent Application No. 10-2017-0184245 filed on Dec. 29, 2017, in the Korean Intellectual Property Office, the disclosure of which is incorporated herein by reference in its entirety.

BACKGROUND

Field of the Disclosure

The present disclosure relates to a display device, and more particularly, to a display device integrated with a touch screen. Although the present disclosure is suitable for a wide scope of applications, it is particularly suitable for adopting both a capacitive touch sensor and a photo touch sensor in the touch screen of the display device without sacrificing an aperture ratio.

Description of the Background

Recently, a display field which visually represents an electrical information signal is rapidly being developed. In accordance with the rapid development, various display devices having desirable characteristics such as thin thickness, light weight, and low power consumption properties have been developed. Examples of the above-mentioned display device may include a liquid crystal display device (LCD), an organic light emitting display device (OLED), and the like.

In recent years, display devices have been breaking away from the conventional input systems, such as a button, a keyboard, and a mouse, and have usually adopted a touch screen which allows a user to intuitively and conveniently input information or commands. In other words, the touch screen is one of input devices that is installed in an image display device and enables a user to input predetermined information by applying a pressure to a touch sensor within the touch screen while viewing the image display device.

The touch screen can be classified into an add-on type, an on-cell type, and an in-cell type according to its structure. Particularly, touch screen in-cell type display devices are being widely used since they are suitable for display devices with thin thickness and improved durability.

As a touch sensor in a touch screen in-cell type display device, a photo touch sensor and a capacitive touch sensor are mainly used. The photo touch sensor can recognize a touch based on the intensity of light. The capacitive touch sensor can recognize a touch based on a variation of capacitance.

There has been a demand for application of both the photo touch sensor and the capacitive touch sensor to a touch screen in-cell type display device to improve the touch sensitivity. However, the application of both the photo touch sensor and the capacitive touch sensor to the touch screen in-cell type display device can cause a decrease in an aperture ratio.

SUMMARY

Accordingly, the present disclosure is to provide a display device including both a capacitive touch sensor and a photo touch sensor.

More specifically, the present disclosure is to provide a display device that facilitates design of a photo touch sensor in a supersized display device in which a touch is sensed by a common electrode.

The present disclosure are not limited to the above-mentioned, which are not mentioned above, can be clearly understood by those skilled in the art from the following descriptions.

According to an aspect of the present disclosure, there is provided a display device. The display device includes a pixel electrode and a common electrode disposed in an open area and a gate line disposed as extended in a first direction in a non-open area surrounding the open area and configured to transmit a gate signal to the pixel electrode. The display device further includes a data line disposed as extended in a second direction different from the first direction in the non-open area and configured to transmit a data signal to the pixel electrode. The display device further includes a plurality of sensing lines disposed in the non-open area and configured to transmit a common voltage or a touch scan signal to the common electrode. The display device further includes a photo touch sensor disposed in the non-open area and electrically connected to any one of the plurality of sensing lines.

According to another aspect of the present disclosure, there is provided a display device. The display device includes common electrodes configured to generate an electric field with pixel electrodes when applied with a common voltage during a display driving period and sense a touch when applied with a touch scan signal during a touch driving period. The display device further includes a plurality of touch blocks in which the common electrodes are disposed in groups, and a plurality of sensing lines disposed corresponding to the plurality of touch blocks, respectively. The display device further includes a photo touch sensor configured to sense a touch during the touch driving period. Each of the plurality of touch blocks is electrically connected to any one of the plurality of sensing lines, and the photo touch sensor is disposed along the positions of the sensing lines connected to the respective touch blocks. Therefore, in the display device according to the present disclosure in which a touch is sensed by the common electrode, the photo touch sensor can be easily disposed.

Other detailed matters of the aspects are included in the detailed description and the drawings.

According to the present disclosure, a photo touch sensor is disposed as directly connected to a sensing line adjacent to a common electrode among a plurality of sensing lines. Thus, the photo touch sensor can be easily disposed.

Further, according to the present disclosure, in a plurality of touch blocks, if a sensing line connected to a common electrode is disposed adjacent to the common electrode, a photo touch sensor is disposed in a corresponding touch block. In the plurality of touch blocks, if a sensing line connected to a common electrode is not disposed adjacent to the common electrode, a photo touch sensor is not disposed in a corresponding touch block. Therefore, electrical connection between a photo touch sensor and a sensing line can be easily established. Thus, a display device can be easily designed.

The effects according to the present disclosure are not limited to the contents exemplified above, and more various effects are included in the present disclosure.

BRIEF DESCRIPTION OF THE DRAWINGS

The above and other aspects, features and other advantages of the present disclosure will be more clearly under

DETAILED DESCRIPTION

Figure 1:
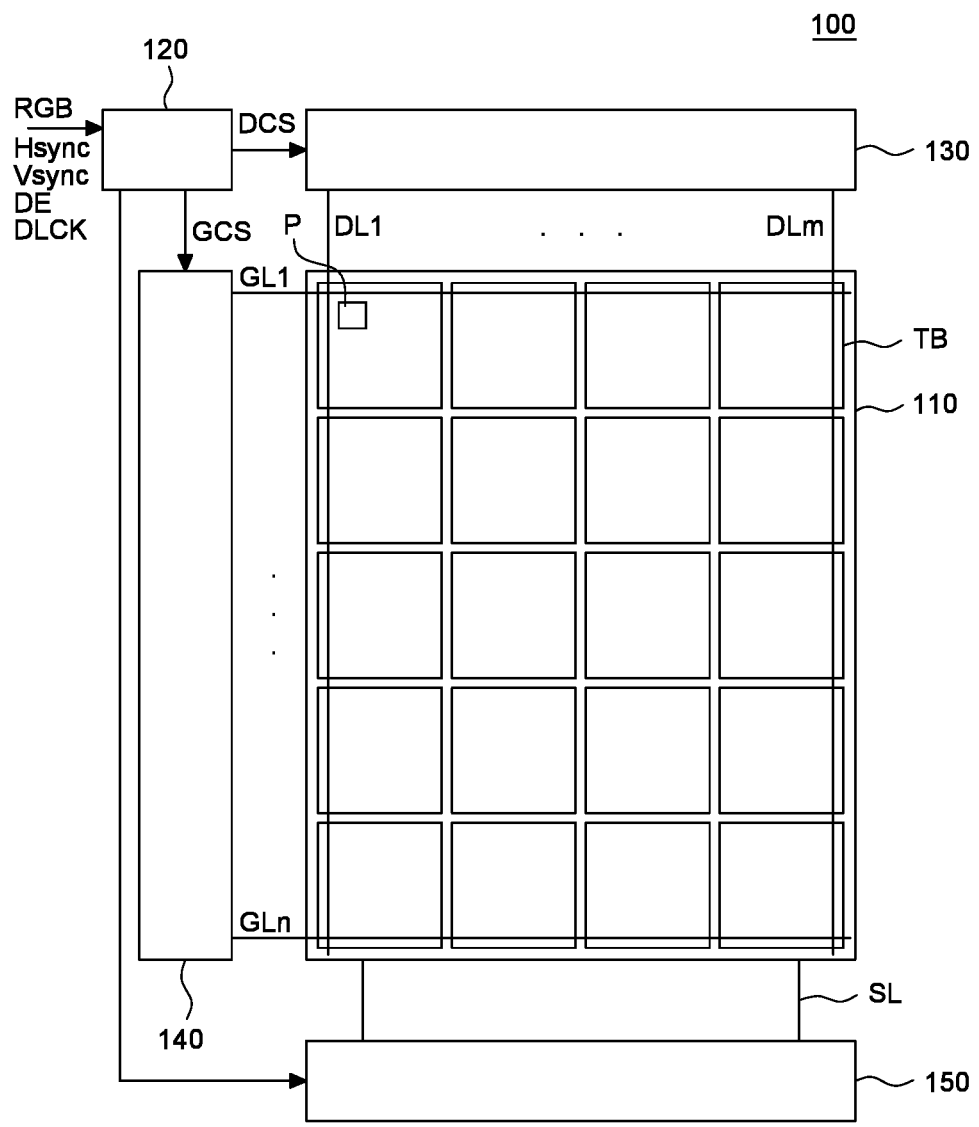
- FIG. 1 is a block diagram provided to explain a display device according to an exemplary aspect of the present disclosure.

Advantages and characteristics of the present disclosure and a method of achieving the advantages and characteristics will be clear by referring to exemplary aspects described below in detail together with the accompanying drawings. However, the present disclosure is not limited to the following exemplary aspects but may be implemented in various different forms. The exemplary aspects are provided only to complete disclosure of the present disclosure and to fully provide a person having ordinary skill in the art to which the present disclosure pertains with the category of the disclosure, and the present disclosure will be defined by the appended claims.

The shapes, sizes, ratios, angles, numbers, and the like illustrated in the accompanying drawings for describing the exemplary aspects of the present disclosure are merely examples, and the present disclosure is not limited thereto. Like reference numerals generally denote like elements throughout the specification. Further, in the following description, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for the convenience of description, and the present disclosure is not limited to the size and the thickness of the component illustrated.

The features of various aspects of the present disclosure can be partially or entirely bonded to or combined with each other and can be interlocked and operated in technically various ways, and the aspects can be carried out independently of or in association with each other.

The exemplary aspects of the present disclosure will be described based on a liquid crystal display device. However, the present disclosure is not limited to the liquid crystal display device and can be applied to all kinds of display devices such as an organic light emitting display device.

Hereinafter, the present disclosure will be explained with reference to the accompanying drawings.

Figure 2:
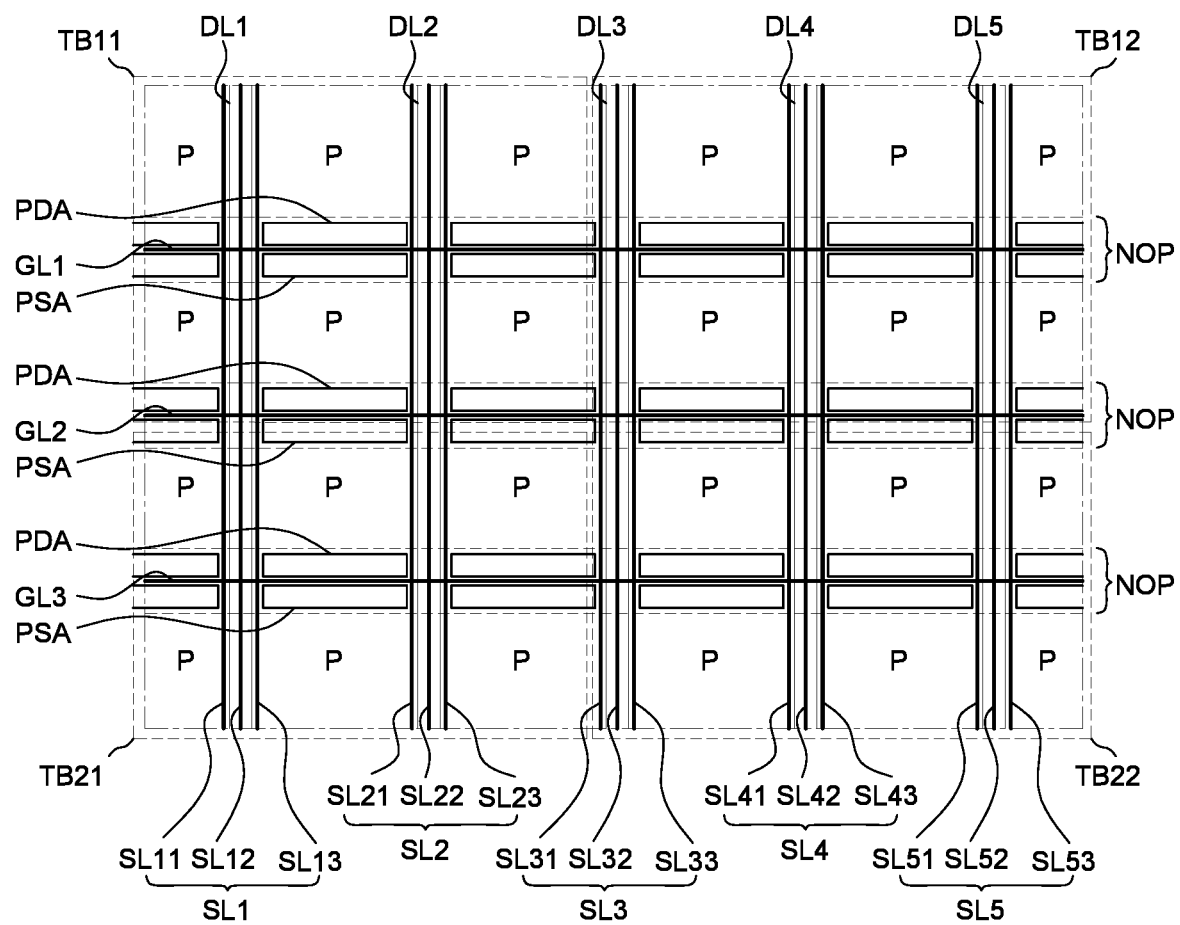
FIG. 2 is a plan view schematically illustrating a partial area of a display panel illustrated in FIG. 1.
Figure 3:
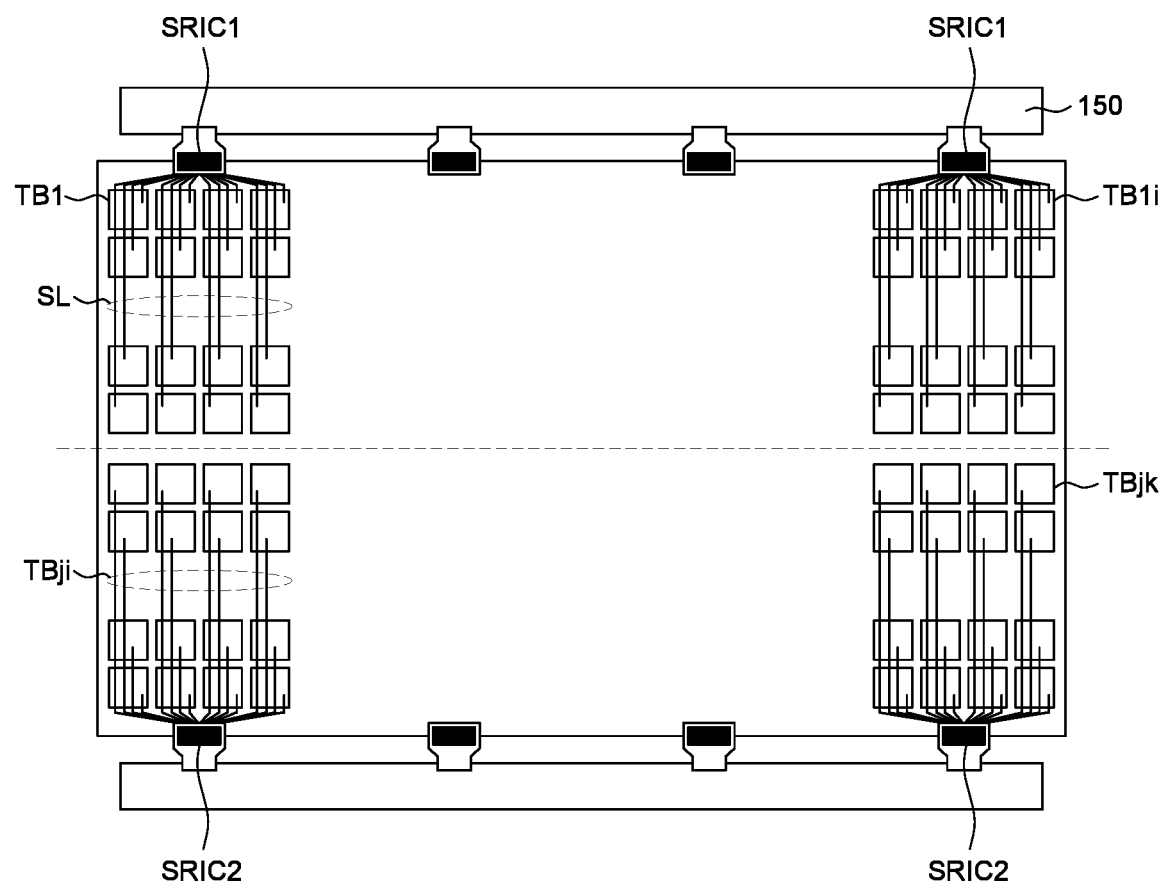
FIG. 3 is a conceptual diagram provided to explain a configuration of touch blocks disposed in the display panel illustrated in FIG. 1.

FIG. 1 is a block diagram provided to explain a display device according to an exemplary aspect of the present disclosure. FIG. 2 is a plan view schematically illustrating a partial area of a display panel illustrated in FIG. 1. FIG. 3 is a conceptual diagram provided to explain a configuration of touch blocks disposed in the display panel illustrated in FIG. 1.

Referring to FIG. 1, a display device 100 according to an exemplary aspect of the present disclosure includes a display panel 110, a timing controller 120, a data driver 130, a gate driver 140, and a touch driver 150.

The display panel 110 includes n number of gate lines GL1, . . . , GLn disposed in a first direction, m number of data lines DL1, . . . , DLm disposed in a direction different from the first direction, a plurality of pixels P electrically connected to the n number of gate lines GL1, . . . , GLn and the m number of data lines DL1, . . . , DLm. The plurality of pixels P displays an image in response to a driving signal or driving voltage applied through the gate lines GL1, . . . , GLn and the data lines DL1, . . . , DLm. The plurality of pixels P illustrated in FIG. 1 may be sub-pixels that display different colors from each other, and a plurality of sub-pixels may form a pixel. For example, the sub-pixels may display red, green, and blue or red, green, blue, and white colors.

The display panel 110 includes a touch screen therein. The touch screen functions to sense a touch position of a user. The display panel 110 according to an exemplary aspect of the present disclosure may be a touch screen-integrated display panel in which an in-cell type touch screen using self-capacitance is embedded. Thus, in the display panel 110 according to an exemplary aspect of the present disclosure, a plurality of common electrodes which can be driven as common electrodes when applied with a common voltage and as touch sensing electrodes when applied with a touch sensing voltage is disposed. Further, touch blocks TB in which a plurality of pixels including common electrodes is grouped in predetermined units are disposed.

Each of the touch blocks TB may be disposed corresponding to two or more pixels P. The display device 100 according to an exemplary aspect of the present disclosure is illustrated as a supersized display device, and, thus, a touch block TB is defined as corresponding to two or more pixels P. However, the present disclosure is not limited thereto. There may be a change depending on the size and resolution of the display device or display panel. A common electrode disposed in each of the touch blocks TB may be applied with a common signal for display driving of the display panel 110 and may also be applied with a touch scan signal for touch sensing driving. Therefore, the common electrodes may operate as display driving electrodes that drive liquid crystals together with pixel electrodes. Also, the common electrodes may operate as touch sensing electrodes that sense a touch position. More specifically, the display device 100 according to an exemplary aspect of the present disclosure is a touch screen in-cell type display device. Therefore, display driving and touch driving are performed in a time-division manner in one frame. If the display panel 110 operates in a display driving mode, the common electrodes are applied with a common voltage and operate as common electrodes to perform display driving together with the pixel electrodes. If the display panel 110 operates in a touch driving mode, the common electrodes are applied with a touch scan signal from the touch driver 150 and operate as touch electrodes to sense a touch position. Herein, the common voltage may be applied from the touch driver 150 or directly applied from a separate common voltage generation unit to the display panel 110 without passing through the touch driver 150. The touch blocks TB may be sequentially operated by group during one frame. The number of common electrodes in a group may vary in consideration of a touch driving period and a display driving period.

In the display panel 110 according to the present disclosure, a plurality of sensing lines SL11, SL12, SL13, SL21, SL22, SL23, SL31, SL32, SL33, SL41, SL42, SL43, SL51, SL52, and SL53, at least one of which is connected to each of the touch blocks TB, is disposed in a plurality of sensing line groups SL1, SL2, SL3, SL4, and SL5, as illustrated in FIG. 2. That is, the plurality of sensing lines SL11, SL12, SL13, SL21, SL22, SL23, SL31, SL32, SL33, SL41, SL42, SL43, SL51, SL52, and SL53 may form the plurality of sensing line groups SL1, SL2, SL3, SL4, and SL5. For example, a first sensing line group SL1 may include a 1-1 sensing line SL11, a 1-2 sensing line SL12, and a 1-3 sensing line SL13, and a second sensing line group SL2 may include a 2-1 sensing line SL21, a 2-2 sensing line SL22, and a 2-3 sensing line SL23. A third sensing line group SL3 may include a 3-1 sensing line SL31, a 3-2 sensing line SL32, and a 3-3 sensing line SL33, and a fourth sensing line group SL4 may include a 4-1 sensing line SL41, a 4-2 sensing line SL42, and a 4-3 sensing line SL43. A fifth sensing line group SL5 may include a 5-1 sensing line SL51, a 5-2 sensing line SL52, and a 5-3 sensing line SL53. A sensing line included in each of the plurality of sensing line groups SL1, SL2, SL3, SL4, and SL5 may be one-to-one connected to each touch block TB. For example, one of the first sensing line groups SL11, SL12, and SL13 may be connected to a first touch block TB11, and one of the second sensing line groups SL2 may be connected to a second touch block TB21. In this way, each of the touch blocks can be connected to each sensing line. Meanwhile, sensing lines included in each of the sensing line groups SL1, SL2, SL3, SL4, and SL5 according to an exemplary aspect of the present disclosure may be one-to-one connected first to touch blocks TB11 and TB12 disposed in a first column and then one-to-one connected to touch blocks TB21 and TB22 disposed in a second column. That is, a plurality of sensing lines may be one-to-one connected sequentially to a plurality of touch blocks disposed from the first column to the last column. The adjacent sensing lines forming the plurality of sensing line groups SL1, SL2, SL3, SL4, and SL5 connected as such may be respectively applied with different signals.

The plurality of sensing lines SL11, SL12, SL13, SL21, SL22, SL31, SL32, SL33, SL41, SL42, SL43, SL51, SL52, and SL53 may be disposed overlapping with an area where a plurality of data lines DL1, DL2, DL3, DL4, and DL5 is disposed. As described above, the plurality of sensing lines SL11, SL12, SL13, SL21, SL22, SL23, SL31, SL32, SL33, SL41, SL42, SL43, SL51, SL52, and SL53 may form a plurality of sensing line groups, and the sensing lines in the groups may be disposed to be one-to-one matched with the plurality of data lines. Herein, sensing lines forming a sensing line group corresponding to the same data line may be respectively applied with different signals. For example, if the first sensing line group SL1 corresponds to the first data line DL1, the 1-1 sensing line SL11, the 1-2 sensing line SL12, and the 1-3 sensing line SL13 forming the first sensing line group SL1 may be respectively applied with different signals. One or more of sensing lines forming a group may be disposed to overlap with data lines, respectively. For example, the 1-2 sensing line SL12 in the first sensing line group SL1 may be disposed overlapping with the first data lines DL1, and the 2-2 sensing line SL22 in the second sensing line group SL2 may be disposed overlapping with the second data lines DL2. FIG. 2 illustrates that only one of sensing lines forming a group overlaps with a data line. However, all of sensing lines forming a group may be disposed to overlap with data lines, respectively. Meanwhile, FIG. 2 illustrates that three sensing lines form each of the sensing line groups SL1, SL2, SL3, SL4, and SL5. However, the number of sensing lines forming a group may vary depending on the size of the display panel 110 and the number of pixels disposed per unit area. Therefore, an exemplary aspect of the present disclosure is not limited to FIG. 2. As such, a plurality of sensing lines is disposed to overlap with a non-open area in which data lines are disposed between adjacent pixel areas, i.e., open areas, and, thus, a decrease in aperture ratio can be minimized. Also, a sufficient number of sensing lines can be disposed. In a supersized display device, there is no need to reduce the size of touch blocks, and, thus, high touch sensitivity can be maintained.

Meanwhile, if the number of sensing lines forming each sensing line group is 3 as described in an exemplary aspect of the present disclosure, the size of each touch block TB is set to correspond to 40 pixels P in width and 12 pixels P in length. If 180 touch blocks TB are disposed lengthwise, at least one sensing line needs to be connected to each of the 180 touch blocks TB. Herein, 40 pixels P are disposed widthwise and three sensing lines are disposed between pixel electrodes in a second column adjacent to the left side of a pixel P in a first column. Therefore, a total of 120 sensing lines can be secured. Accordingly, if a double feeding method is adopted as illustrated in FIG. 3, 120 sensing lines can be assigned to each of 90 touch blocks disposed in the upper half area of the 180 touch blocks TB disposed lengthwise and 90 touch blocks disposed in the lower half area. Therefore, sensing lines are divided into the upper half area and the lower half area and connected to the touch blocks TB disposed in the upper half area and the lower half area of the display panel 110. The total number of sensing lines can be reduced by half. Therefore, it is not necessary to occupy an opening in a pixel area where an image is displayed. Accordingly, any sensing line included in a sensing line group does not pass through the opening in the pixel area. Thus, this can be applied to a supersized display device without a bad influence on the display quality.

Each of the plurality of touch blocks TB may include a plurality of photo touch sensors. A photo touch sensor recognizes a touch based on a change in off-current varying depending on the intensity of light. The photo touch sensor is directly connected to any one of sensing lines forming a plurality of sensing groups and may transmit a touch sensing signal sensed by the photo touch sensor to the touch driver 150 through the connected sensing line. Herein, the sensing line electrically connected to the photo touch sensor may also be electrically connected to a common electrode. That is, the photo touch sensor and the common electrode may be electrically connected to the same sensing line. However, if the common electrode is electrically connected to one of sensing lines forming a sensing group and the one sensing line makes it difficult to dispose the photo touch sensor, the photo touch sensor according to an exemplary aspect of the present disclosure may not be disposed in a corresponding pixel. Even if the photo touch sensor is disposed, it may not be electrically connected. As such, if the photo touch sensor is not disposed or the photo touch sensor is disposed but not connected to any one of sensing lines, a photo sensing block may be defined separately from the touch block TB. That is, a touch block TB defined as a touch sensing block by common electrodes and a photo sensing block defined as a touch sensing block by photo touch sensors may be defined as the same block or different blocks. Details thereof will be described later with reference to FIG. 8 and FIG. 9.

As illustrated in FIG. 2, each pixel P includes an open area and a non-open area NOP. The non-open area NOP may include a pixel driving area PDA where pixel driving devices configured to drive a pixel electrode and a common electrode disposed in the open area to display an image are disposed and a photo sensing area PSA where a photo touch sensor is disposed. The photo touch sensor may be disposed in the photo sensing area PSA. Herein, the non-open area NOP refers to the non-open area disposed in the first direction in which a plurality of gate lines GL1, GL2, and GL3 is disposed.

The timing controller 120 transmits an input image signal RGB received from a host system to the data driver 130. The timing controller 120 generates a timing control signal for controlling operation timing of the data driver 130 and the gate driver 140 using timing signals such as a clock signal DCLK, a horizontal synchronization signal Hsync, a vertical synchronization signal Vsync, and a data enable signal DE received together with the input image signal RGB. The timing controller 120 generates a control signal DCS of the data driver 130 and a control signal GCS of the gate driver 140 in synchronization with the timing signals. The timing controller 120 generates a touch enable signal and transmits the touch enable signal to the touch driver 150.

The data driver 130 generates a sampling signal using the data driving control signal DCS transmitted from the timing controller 120 and latches image data input from the timing controller 120 into a data signal according to the sampling signal and then supplies the data signal to the data lines DL1, . . . DLm in response to a source output enable signal (SOE). The data driver 130 may be connected to a bonding pad of the display panel 110 by a chip-on-glass (COG) method or may be directly disposed on the display panel 110. In some cases, the data driver 130 may be integrated with the display panel 110. Otherwise, the data driver 130 may be disposed by a chip-on-film (COF) method.

The gate driver 140 sequentially supplies gate signals to the gate lines GL1, GL2, . . . , GLn in response to the gate driving control signal GCS transmitted from the timing controller 120. The gate driver 140 may include a shift register and a level shifter. The gate driver 140 may be disposed independently of the display panel 110, or may be embedded as a thin film in the display panel 110 by a gate-in-panel (GIP) method on a non-active area of the display panel 110 where pixels P are not disposed during manufacture of a substrate of the display panel 110.

The touch driver 150 may generate a touch scan signal in response to the touch enable signal transmitted from the timing controller 120, sense a touch or non-touch using a difference between touch sensing signals, and apply the common voltage or the touch scan signal to a plurality of touch blocks TB. According to a driving mode of the display panel 110, the touch driver 150 may apply the common voltage or the touch scan signal to each of the plurality of touch blocks TB through the sensing lines SL. Then, the touch driver 150 may receive a capacitive touch sensing signal sensed by a touch block TB and a photo touch sensing signal sensed by a photo touch sensor in response to the touch scan signal. Then, the touch driver 150 may sense a touch or non-touch using a difference between the received touch sensing signals.

Figure 4A:
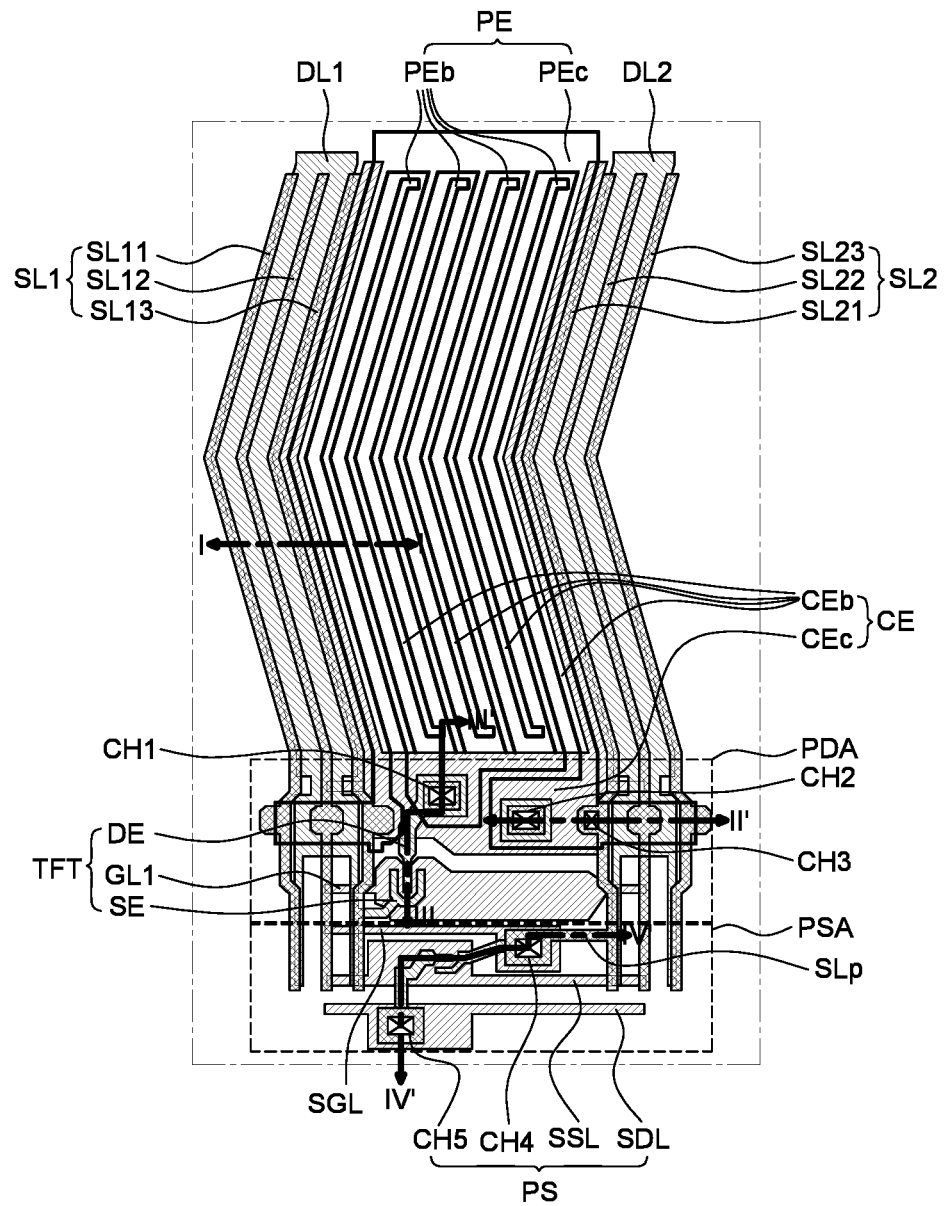
FIG. 4A is a plan view provided to explain a pixel structure in a display device according to an exemplary aspect of the display panel illustrated in FIG. 1.
Figure 4B:
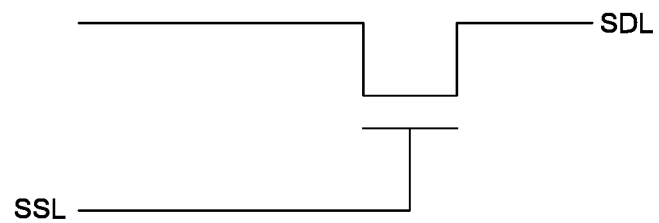
FIG. 4B is a circuit diagram schematically illustrating a photo touch sensor illustrated in FIG. 4A.

FIG. 4A is a plan view provided to explain a pixel structure in a display device according to an exemplary aspect of the display panel illustrated in FIG. 1. FIG. 4B is a circuit diagram schematically illustrating a photo touch sensor illustrated in FIG. 4A.

Referring to FIG. 4A, a pixel P according to an exemplary aspect of the present disclosure includes an open area where an image is displayed by a pixel electrode PE and a common electrode CE. Further, the pixel P includes a non-open area where driving devices, e.g., a thin film transistor and a photo touch sensor PS, for driving the pixel electrode PE and the common electrode CE in the open area are disposed.

In the open area, the pixel electrode PE and the common electrode CE are disposed.

The pixel electrode PE generates an electric field with the common electrode CE during a display driving period of the display panel 110. The pixel electrode PE includes a plurality of pixel branch electrodes PEb equally spaced in parallel with each other and a pixel stem electrode PEc connecting the plurality of pixel branch electrodes PEb. The pixel electrode PE is not only disposed in the open area, but may also be disposed in the non-open area.

The common electrode CE includes a plurality of common branch electrodes CEb equally spaced in parallel with each other and a common stem electrode CEc connecting the plurality of common branch electrodes CEb. The common branch electrodes CEb may be disposed alternately with the plurality of pixel branch electrodes PEb of the pixel electrode PE and may be disposed adjacent to the data lines DL1 and DL2. The common electrode CE is generally disposed on a front surface of the display panel 110.

In the non-open area, the first and second data lines DL1 and DL2, the gate line GL1, a thin film transistor TFT, the first and second sensing line groups SL1 and SL2, a sensing data line SDL, a sensing storage line SSL, and a sensing gate line SGL may be disposed. Among these components disposed in the non-open area, the gate line GL1 and the thin film transistor TFT are disposed in the pixel driving area PDA of the non-open area. The sensing data line SDL, the sensing storage line SSL, and the sensing gate line SGL are disposed in the photo sensing area PSA of the non-open area.

The first data line DL1, the second data line DL2, and the first gate line GL may define the open area.

The thin film transistor TFT may be disposed in the pixel driving area PDA. The thin film transistor TFT may include the first gate line GL1 as a gate electrode, a source electrode SE branched from the first data lines DL1, a drain electrode DE spaced from the source electrode SE, and an active layer (not illustrated). The thin film transistor is electrically connected to the pixel electrode PE through a first contact hole CH1.

A plurality of sensing lines SL11, SL12, and SL13 forming the first sensing line group SL1 is disposed in an area overlapping with the first data line DL1. A plurality of sensing lines SL21, SL22, and SL23 forming the second sensing line group SL2 is disposed in an area overlapping with the second data lines DL2. Particularly, among the plurality of sensing lines SL21, SL22, and SL23 forming the second sensing line group SL2, the 2-1 sensing line SL21 may be electrically connected to the common electrode CE. The 2-1 sensing line SL21 receives a common voltage from the touch driver 150 and applies the common voltage to the common electrode CE during a display driving period of the display panel 110. Further, the 2-1 sensing line SL21 receives a touch scan signal from the touch driver 150 and applies the touch scan signal to the common electrode CE during a touch driving period of the display panel 110.

Furthermore, the 2-1 sensing line SL21 may be electrically connected to the sensing gate line SGL in the photo sensing area PSA by a sensing line protrusion SLp protruding from the 2-1 sensing line SL21. Meanwhile, FIG. 4A illustrates that the 2-1 sensing line SL21 among the plurality of sensing lines SL21, SL22, and SL23 forming the second sensing line group SL2 is electrically connected to the sensing gate line SGL of the photo touch sensor PS in the photo sensing area PSA, but the present disclosure is not limited thereto. If the common electrode is connected to the 1-3 sensing line SL13 of the first sensing line group SL1, the sensing gate line SGL of the photo touch sensor in the photo sensing area PSA can also be connected to the 1-3 sensing line SL13. That is, in the display device 100 according to an exemplary aspect of the present disclosure, the sensing gate line SGL may be electrically connected to a sensing line closest to a common electrode in the open area, a photo touch sensor PS in the non-open area, or a pixel driving device such as the thin film transistor among a plurality of sensing lines for electrical connection with the photo touch sensor PS. Therefore, in the display device 100 according to an exemplary aspect of the present disclosure, the common electrode CE may be connected to a sensing line adjacent to a photo touch sensor or a pixel driving device among a plurality of sensing lines to improve the easiness of the photo touch sensor.

The photo sensing area PSA refers to an area where the photo touch sensor PS is disposed. The sensing data line SDL, the sensing storage line SSL, and the sensing gate line SGL are disposed in the photo sensing area PSA. Herein, the sensing data line SDL, the sensing storage line SSL, and the sensing gate line SGL are spaced from each other and may be disposed in the first direction in which the gate line GL is extended. Herein, if the sensing gate line SGL is not disposed in the first direction, the photo touch sensor PS needs to have a contact hole under a plurality of sensing lines for electrical connection with any one of the plurality of sensing lines. In this case, the contact hole is disposed in an area overlapping with the plurality of sensing lines, which may cause asymmetric capacitance. Thus, it becomes difficult to dispose the data lines DL. However, as described in an exemplary aspect of the present disclosure, the sensing gate line SGL for applying a touch scan signal to the photo touch sensor PS is disposed in the first direction, and, thus, it is possible to form a separate area for the photo touch sensor PS. Therefore, when the photo touch sensor PS is disposed, the degree of freedom in design can be improved. Further, the photo touch sensor PS may be connected in a voltage-driven manner as illustrated in FIG. 4B.

Referring to FIG. 4B, the photo touch sensor PS includes a sensor thin film transistor and a sensor storage capacitor. Specifically, in the photo touch sensor PS, when a sensor transistor is turned on depending on the intensity of light, a sensor storage is charged with a voltage, and the voltage is output to a sensing line SL electrically connected thereto at a predetermined timing to recognize a touch. Herein, the voltage applied through the sensing data line SDL may have a higher level than the voltage applied to the common electrode CE to sense a touch.

The photo touch sensor PS configured as illustrated in FIG. 4B may sense a touch sensing signal together with the common electrode CE during a touch driving period. A general common electrode senses a touch by an LFD method. However, according to the present disclosure, in order for the common electrode CE and the photo touch sensor PS to sense a touch simultaneously during a touch driving period, the sensing data line SDL is applied with a higher voltage than a touch voltage used for the conventional LFD method. For example, in the display device 100 according to an exemplary aspect of the present disclosure, a voltage of a first level may be applied to the common electrode CE and a voltage of a second level of a higher level than the first level may also be applied to the sensing data line SDL to sense a touch. Herein, the reason why the sensing data line SDL is applied with a higher voltage than a voltage applied to the common electrode CE is to make a difference in delay and thus distinguish a touch sensing signal sensed by the common electrode CE. Therefore, in the display device 100 according to an exemplary aspect of the present disclosure, a voltage of a high level is applied to the sensing data line SDL in order for the photo touch sensor PS to sense a touch simultaneously with the common electrode CE. Thus, it is possible to design the display device 100 in which common electrode touch sensing by finger and touch sensing by light can be performed simultaneously.

A cross-section of the pixel configured as described above will be described in detail with reference to FIG. 5A through FIG. 5D.

Figure 5A:
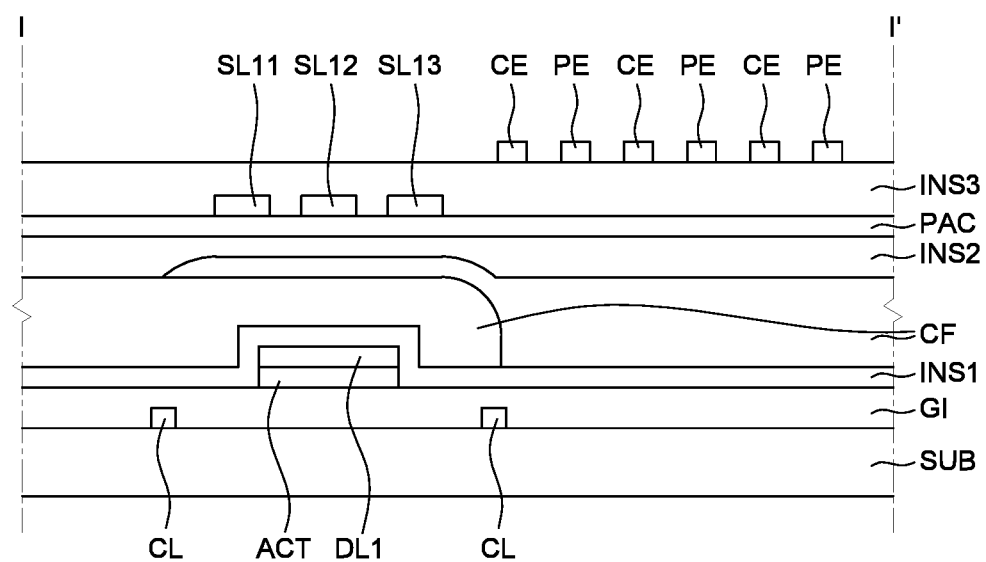
FIG. 5A is a cross-sectional view taken along line I-I' of FIG. 4A.

FIG. 5A is a cross-sectional view taken along line I-I' of FIG. 4A.

Referring to FIG. 5A, in the display panel 110 according to an exemplary aspect of the present disclosure, common lines CL are disposed on a substrate SUB. The common lines CL may be disposed to open one side of the pixel area and connected to each other within an area corresponding to the touch block TB. A gate insulating layer GI is disposed on the substrate SUB on which the common lines CL are disposed.

The gate insulating layer GI electrically insulates the common lines CL from an active layer ACT which is not illustrated, but disposed on the gate lines GL and the gate insulating layer GI. The gate insulating layer GI may be formed as, e.g., a silicon oxide layer (SiOx), a silicon nitride layer (SiNx), or a multilayer thereof. The active layer ACT is disposed on the gate insulating layer GI.

The active layer ACT may be formed of any one of, e.g., polycrystalline silicon, low temperature polysilicon (LTPS), and an oxide semiconductor. The first data line DL1 is disposed on the active layer ACT.

The first data line DL1 may be formed of one of molybdenum (Mo), aluminum (Al), chromium (Cr), gold (Au), titanium (Ti), nickel (Ni), neodymium (Nd), and copper (Cu), or alloys thereof. A first insulating layer INS1 is disposed on the first data line DL1.

The first insulating layer INS1 may be formed as, e.g., a silicon oxide layer (SiOx), a silicon nitride layer (SiNx), or a multilayer thereof. A color filter CF may be disposed on the first insulating layer INS1.

The color filter CF may be disposed in the open area and the non-open area. The color filter CF may include only any one of red, green, and blue color filters in the open area and a structure in which a red color filter and a blue color filter are laminated in the non-open area to shield light. A second insulating layer INS2 is disposed on the color filter CF.

The second insulating layer INS2 may be formed as, e.g., a silicon oxide layer (SiOx), a silicon nitride layer (SiNx), or a multilayer thereof. An overcoating layer PAC is disposed on the second insulating layer INS2.

The overcoating layer PAC is formed to flatten steps on the lower side. The overcoating layer PAC may be formed of an organic material such as photo acryl, polyimide, benzocyclobutene resin, and acrylate resin. A plurality of sensing lines SL11, SL12, and SL13 is disposed on the overcoating layer PAC.

At least one sensing line of the plurality of sensing lines SL11, SL12, and SL13 may be disposed on the overcoating layer PAC to overlap with the first data line DL1 on the lower side. For example, the 1-2 sensing line SL12 may be disposed to fully overlap with the first data line DL1 and the 1-1 sensing line SL11 and the 1-3 sensing line SL13 may be disposed to partially overlap with the first data line DL1. As such, the plurality of sensing lines SL11, SL12, and SL13 is disposed to overlap with the first data line DL1, and, thus, the plurality of sensing lines SL11, SL12, and SL13 can function to shield light and reduce light leakage of the display device. One of the plurality of sensing lines SL11, SL12, and SL13 may be electrically connected to a photo touch sensor PS. The plurality of sensing lines SL11, SL12, and SL13 transmits a common voltage to a common electrode CE during a display driving period and transmits a touch scan signal to the common electrode CE and the photo touch sensor PS during a touch driving period. The plurality of sensing lines SL11, SL12, and SL13 may be formed of one of molybdenum (Mo), aluminum (Al), chromium (Cr), gold (Au), titanium (Ti), nickel (Ni), neodymium (Nd), and copper (Cu), or alloys thereof. A third insulating layer INS3 is disposed on the plurality of sensing lines SL11, SL12, and SL13.

The third insulating layer INS3 serves as a passivation layer and may be formed as, e.g., a silicon oxide layer (SiOx), a silicon nitride layer (SiNx), or a multilayer thereof. Herein, the third insulating layer INS3 has been described as a passivation layer, but is not limited thereto and may serve as, e.g., an overcoating layer. Common electrodes CE and pixel electrodes PE are disposed on the third insulating layer INS3.

The common electrodes CE and the pixel electrodes PE are disposed alternately on the third insulating layer INS3. More specifically, the common branch electrodes CEb and the pixel branch electrodes PEb may be disposed alternately in the open area. The common electrodes CE may be driven as common electrodes to generate an electric field for tilting liquid crystals together with the pixel electrodes PE during a display driving period. Further, the common electrodes CE may be driven as touch sensing electrodes to sense a touch sensing signal during a touch driving period. The common electrodes CE and the pixel electrodes PE may be formed of transparent conductive layers. The transparent conductive layers may be transparent conductive materials such as indium tin oxide (ITO) and indium zinc oxide (IZO).

Hereinafter, the interconnection between the common electrodes CE and the sensing lines SL in the non-open area, i.e., the pixel driving area PDA, will be described in more detail.

Figure 5B:
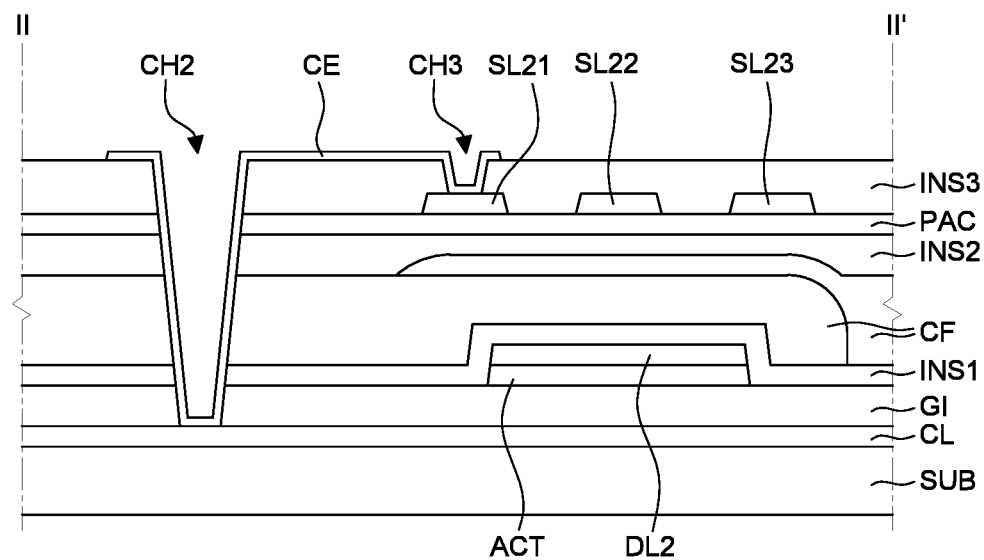
FIG. 5B is a cross-sectional view taken along line II-II' of FIG. 4A.

FIG. 5B is a cross-sectional view taken along line II-II' of FIG. 4A.

Referring to FIG. 5B, in the display panel 110 according to an exemplary aspect of the present disclosure, a common line CL is disposed on the substrate SUB. The gate insulating layer GI is disposed on the common line CL.

The gate insulating layer GI is disposed to electrically insulate the common line CL from the active layer ACT. The gate insulating layer GI may be formed as, e.g., a silicon oxide layer (SiOx), a silicon nitride layer (SiNx), or a multilayer thereof. The active layer ACT is disposed on the gate insulating layer GI.

The active layer ACT may be formed of one of, polycrystalline silicon, low temperature polysilicon (LTPS), and an oxide semiconductor. The second data line DL2 is disposed on the active layer ACT.

The second data line DL2 may be formed of any one selected from the group consisting of molybdenum (Mo), aluminum (Al), chromium (Cr), gold (Au), titanium (Ti), nickel (Ni), neodymium (Nd), and copper (Cu), or alloys thereof. The first insulating layer INS1 is disposed on the second data line DL2.

The first insulating layer INS1 may be formed as, a silicon oxide layer (SiOx), a silicon nitride layer (SiNx), or a multilayer thereof. The color filter CF may be disposed on the first insulating layer INS1.

The color filter CF may have a structure in which a red color filter and a blue color filter are laminated to shield light. The second insulating layer INS2 is disposed on the color filter CF.

The second insulating layer INS2 may be formed as a silicon oxide layer (SiOx), a silicon nitride layer (SiNx), or a multilayer thereof. The overcoating layer PAC is disposed on the second insulating layer INS2.

The overcoating layer PAC is formed to flatten steps on the lower side. The overcoating layer PAC may be formed of an organic material such as photo acryl, polyimide, benzocyclobutene resin, and acrylate resin. A plurality of sensing lines SL21, SL22, and SL23 of the second sensing line group SL2 is disposed on the overcoating layer PAC.

At least one sensing line of the plurality of sensing lines SL21, SL22, and SL23 may be disposed on the overcoating layer PAC to overlap the second data line DL2 on the lower side. For example, the 2-2 sensing line SL22 may be disposed to fully overlap the second data line DL2 and the 2-1 sensing line SL21 and the 2-3 sensing line SL23 may be disposed to partially overlap the second data line DL2. As such, the plurality of sensing lines SL21, SL22, and SL23 is disposed to overlap the second data line DL2, and, thus, the plurality of sensing lines SL21, SL22, and SL23 can function to shield light and reduce light leakage of the display device. One of the plurality of sensing lines SL21, SL22, and SL23 may be electrically connected to a common electrode CE. Referring to FIG. 5B, the 2-1 sensing line SL21 of the plurality of sensing lines SL21, SL22, and SL23 may be electrically connected to the common electrode CE. Therefore, the 2-1 sensing line SL21 transmits a common voltage to the common electrode CE during a display driving period and transmits a touch scan signal to the common electrode CE during a touch driving period. The plurality of sensing lines SL21, SL22, and SL23 may be formed of one of molybdenum (Mo), aluminum (Al), chromium (Cr), gold (Au), titanium (Ti), nickel (Ni), neodymium (Nd), and copper (Cu), or alloys thereof. The third insulating layer INS3 is disposed on the plurality of sensing lines SL21, SL22, and SL23.

The third insulating layer INS3 includes a third contact hole CH3 for electrical connection with the 2-1 sensing line SL21 on the lower side. The third insulating layer INS3 serves as a passivation layer and may be formed as, e.g., a silicon oxide layer (SiOx), a silicon nitride layer (SiNx), or a multilayer thereof. Herein, the third insulating layer INS3 has been described as a passivation layer, but is not limited thereto and may serve as, e.g., an overcoating layer. The common electrode CE is disposed on the third insulating layer INS3.

The common electrode CE is electrically connected to the common line CL through a second contact hole CH2 formed in the gate insulating layer GI, the first insulating layer INS1, the color filter CF, the second insulating layer INS2, the overcoating layer PAC, and the third insulating layer INS3. The common electrode CE may be formed of a transparent conductive layer. The transparent conductive layer may be a transparent conductive material such as indium tin oxide (ITO) and indium zinc oxide (IZO).

Hereinafter, a thin film transistor of the display device and the interconnection between the thin film transistor and a pixel electrode according to an exemplary aspect of the present disclosure will be described in more detail with reference to FIG. 5C.

Figure 5C:
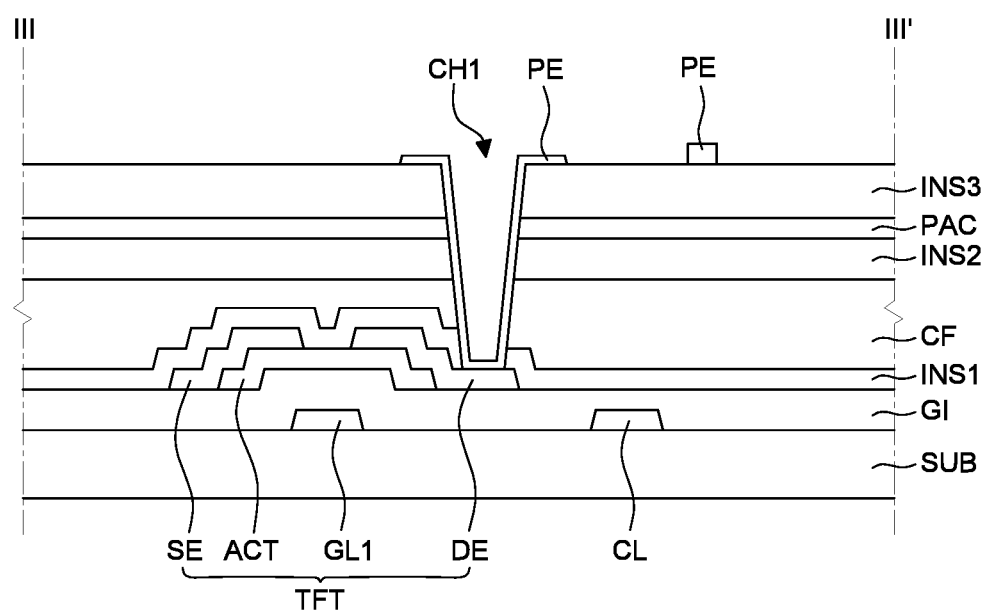
FIG. 5C is a cross-sectional view taken along line III-III' of FIG. 4A.

FIG. 5C is a cross-sectional view taken along line III-III' of FIG. 4A.

Referring to FIG. 5C, a first gate line GL1 and a common line CL are disposed on the substrate SUB. The first gate line GL1 and the common line CL may be formed of one of molybdenum (Mo), aluminum (Al), chromium (Cr), gold (Au), titanium (Ti), nickel (Ni), neodymium (Nd), and copper (Cu), or alloys thereof. The gate insulating layer GI is disposed on the first gate line GL1 and the common line CL.

The gate insulating layer GI electrically insulates the first gate line GL1 and the common line CL from the active layer ACT. The gate insulating layer GI may be formed as, e.g., a silicon oxide layer (SiOx), a silicon nitride layer (SiNx), or a multilayer thereof. The active layer ACT is disposed on the gate insulating layer GI to correspond to an area disposed the first gate line GL1.

The active layer ACT may be formed of one of, e.g., polycrystalline silicon, low temperature polysilicon (LTPS), and an oxide semiconductor. The source electrode SE and the drain electrode DE spaced from the source electrode SE are disposed on the active layer ACT. The active layer ACT may form a channel in a space between the source electrode SE and the drain electrode DE in an upper area corresponding to the first gate line GL1.

The source electrode SE and the drain electrode DE may be formed of one of molybdenum (Mo), aluminum (Al), chromium (Cr), gold (Au), titanium (Ti), nickel (Ni), neodymium (Nd), and copper (Cu), or alloys thereof. The first insulating layer INS1 is disposed on the source electrode SE and the drain electrode DE.

The first insulating layer INS1 may be formed as, e.g., a silicon oxide layer (SiOx), a silicon nitride layer (SiNx), or a multilayer thereof. The color filter CF may be disposed on the first insulating layer INS1.

The color filter CF may have a structure in which a red color filter and a blue color filter are laminated to shield light. The second insulating layer INS2 is disposed on the color filter CF.

The second insulating layer INS2 may be formed as, e.g., a silicon oxide layer (SiOx), a silicon nitride layer (SiNx), or a multilayer thereof. The overcoating layer PAC is disposed on the second insulating layer INS2.

The overcoating layer PAC is formed to flatten steps on the lower side. The overcoating layer PAC may be formed of an organic material such as photo acryl, polyimide, benzocyclobutene resin, and acrylate resin. The third insulating layer INS3 is disposed on the overcoating layer PAC.

The third insulating layer INS3 includes the first contact hole CH1 for electrical connection between a pixel electrode PE and a thin film transistor TFT. Specifically, the first contact hole CH1 is formed in the first insulating layer INS1, the color filter CF, the second insulating layer INS2, the overcoating layer PAC, and the third insulating layer INS3 to partially expose a partial upper part of the drain electrode DE of the thin film transistor TFT. The third insulating layer INS3 serves as a passivation layer and may be formed as, e.g., a silicon oxide layer (SiOx), a silicon nitride layer (SiNx), or a multilayer thereof. Herein, the third insulating layer INS3 has been described as a passivation layer, but is not limited thereto and may serve as, e.g., an overcoating layer. The pixel electrode PE is disposed on the third insulating layer INS3.

The pixel electrode PE is electrically connected to the drain electrode DE of the thin film transistor TFT through the first contact hole CH1 formed in the first insulating layer INS1, the color filter CF, the second insulating layer INS2, the overcoating layer PAC, and the third insulating layer INS3. In an exemplary aspect of the present disclosure, the pixel electrode PE is illustrated as electrically connected to the drain electrode DE of the thin film transistor TFT, but is not limited thereto. For example, the pixel electrode PE may be connected to the source electrode SE of the thin film transistor TFT. The pixel electrode PE may be formed of a transparent conductive layer. The transparent conductive layer may be a transparent conductive material such as indium tin oxide (ITO) and indium zinc oxide (IZO).

Hereinafter, a cross-sectional structure of the photo touch sensor PS according to an exemplary aspect of the present disclosure will be described in more detail.

Figure 5D:
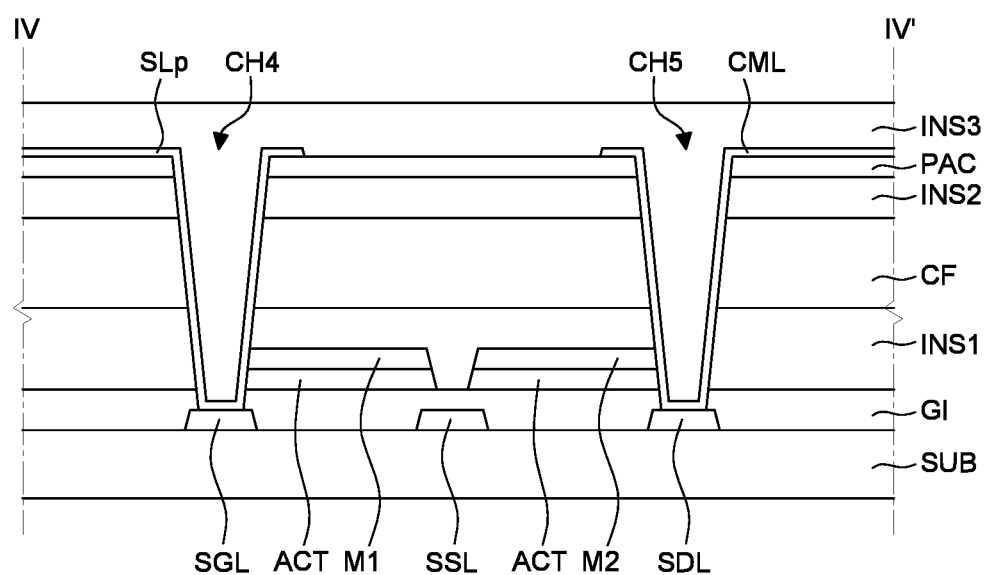
FIG. 5D is a cross-sectional view taken along line IV-IV' of FIG. 4A.

FIG. 5D is a cross-sectional view taken along line IV-IV' of FIG. 4A.

Referring to FIG. 5D, the sensing gate line SGL, the sensing storage line SSL, and the sensing data line SDL are disposed on the substrate SUB. The sensing gate line SGL, the sensing storage line SSL, and the sensing data line SDL may be disposed as extended in the first direction in which the first gate line GL is extended. The sensing gate line SGL is disposed in the first direction and thus can be directly connected to any one of a plurality sensing lines disposed overlapping with the data lines DL. The sensing gate line SGL, the sensing storage line SSL, and the sensing data line SDL may be formed of any one selected from the group consisting of molybdenum (Mo), aluminum (Al), chromium (Cr), gold (Au), titanium (Ti), nickel (Ni), neodymium (Nd), and copper (Cu), or alloys thereof. The gate insulating layer GI is disposed on the sensing gate line SGL, the sensing storage line SSL, and the sensing data line SDL.

The gate insulating layer GI electrically insulates the sensing gate line SGL, the sensing storage line SSL, and the sensing data line SDL from the active layer ACT. The gate insulating layer GI may be formed as, e.g., a silicon oxide layer (SiOx), a silicon nitride layer (SiNx), or a multilayer thereof. The active layer ACT is disposed on the gate insulating layer GI to correspond to an area disposed the first gate line GL1.

The active layer ACT may be formed of any one of, e.g., polycrystalline silicon, low temperature polysilicon (LTPS), and an oxide semiconductor. A first metal line M1 and a second metal line M2 are disposed on the active layer ACT.

The first metal line M1 and the second metal line M2 may be configured to form the photo touch sensor PS. More specifically, when a touch scan signal is input through the sensing gate line SGL, the first metal line M1 or the second metal line M2 charges a voltage in a storage capacitor with the sensing storage line SGL on the lower side. When the charged voltage has a level to be applied from the sensing data line SDL, a touch sensing signal is output through a sensing line. The first metal line M1 and the second metal line M2 may be formed of any one selected from the group consisting of molybdenum (Mo), aluminum (Al), chromium (Cr), gold (Au), titanium (Ti), nickel (Ni), neodymium (Nd), and copper (Cu), or alloys thereof. The first insulating layer INS1 is disposed on the source electrode SE and the drain electrode DE.

The first insulating layer INS1 may be formed as, e.g., a silicon oxide layer (SiOx), a silicon nitride layer (SiNx), or a multilayer thereof. The color filter CF may be disposed on the first insulating layer INS1.

The color filter CF may have a structure in which a red color filter and a blue color filter are laminated to shield light. The second insulating layer INS2 is disposed on the color filter CF.

The second insulating layer INS2 may be formed as, e.g., a silicon oxide layer (SiOx), a silicon nitride layer (SiNx), or a multilayer thereof. The overcoating layer PAC is disposed on the second insulating layer INS2.

The overcoating layer PAC is formed to flatten steps on the lower side. The overcoating layer PAC may be formed of an organic material such as photo acryl, polyimide, benzocyclobutene resin, and acrylate resin. A sensing line protrusion SLp protruding from the 1-3 sensing line SL13 and a connection metal line CML are disposed on the overcoating layer PAC.

The sensing line protrusion SLp may be electrically connected to the sensing gate line SGL through a fourth contact hole CH4 formed in the gate insulating layer GI, the first insulating layer INS1, the color filter CF, the second insulating layer INS2, the overcoating layer PAC, and the third insulating layer INS3. Herein, the fourth contact hole CH4 is formed to expose a partial upper surface of the sensing gate line SGL and a lateral surface of the first metal line M1 to electrically connect the sensing gate line SGL and the first metal line M1. Herein, FIG. 5D illustrates that the fourth contact hole CH4 is formed to expose only the lateral surface of the first metal line M1, but the present disclosure is not limited thereto. The fourth contact hole CH4 may be formed to expose the lateral surface and a partial upper surface of the first metal line M1. Therefore, a touch scan signal input through the 1-3 sensing line SL13 can be applied to the photo touch sensor PS and a touch sensing signal sensed by the photo touch sensor PS can be transmitted to the 1-3 sensing line SL13. The sensing line protrusion SLp may be branched from the 1-3 sensing line SL13 and thus may be formed of the same material as the 1-3 sensing line SL13.

The connection metal line CML may be electrically connected to the sensing data line SDL through a fifth contact hole CH5 formed in the gate insulating layer GI, the first insulating layer INS1, the color filter CF, the second insulating layer INS2, the overcoating layer PAC, and the third insulating layer INS3. Herein, the fifth contact hole CH5 is formed to expose a partial upper surface of the sensing data line SDL and a lateral surface of the second metal line M2 to electrically connect the sensing data line SDL and the second metal line M2. Herein, FIG. 5D illustrates that the fifth contact hole CH5 is formed to expose only the lateral surface of the second metal line M2, but the present disclosure is not limited thereto. The fifth contact hole CH5 may be formed to expose the lateral surface and a partial upper surface of the second metal line M2. Therefore, when a voltage charged in the photo touch sensor PS has the same level as a voltage to be applied from the sensing data line SDL, the voltage is output through the 1-3 sensing line SL13. The third insulating layer INS3 is disposed on the sensing line protrusion SLp and the connection metal line CML.

As described above, the photo touch sensor PS is disposed in a voltage-driven manner, and, thus, it is possible to distinguish touch sensing by the common electrode CE from touch sensing by the photo touch sensor PS. Therefore, during a touch driving period of the display panel 110, touch sensing by the common electrode CE and touch sensing by the photo touch sensor PS can be performed simultaneously.

Meanwhile, the photo touch sensor PS may be disposed in a current-driven manner. Hereinafter, touch sensing by the common electrode CE and a method of sensing a touch in a current-driven manner will be described in more detail.

Figure 6A:
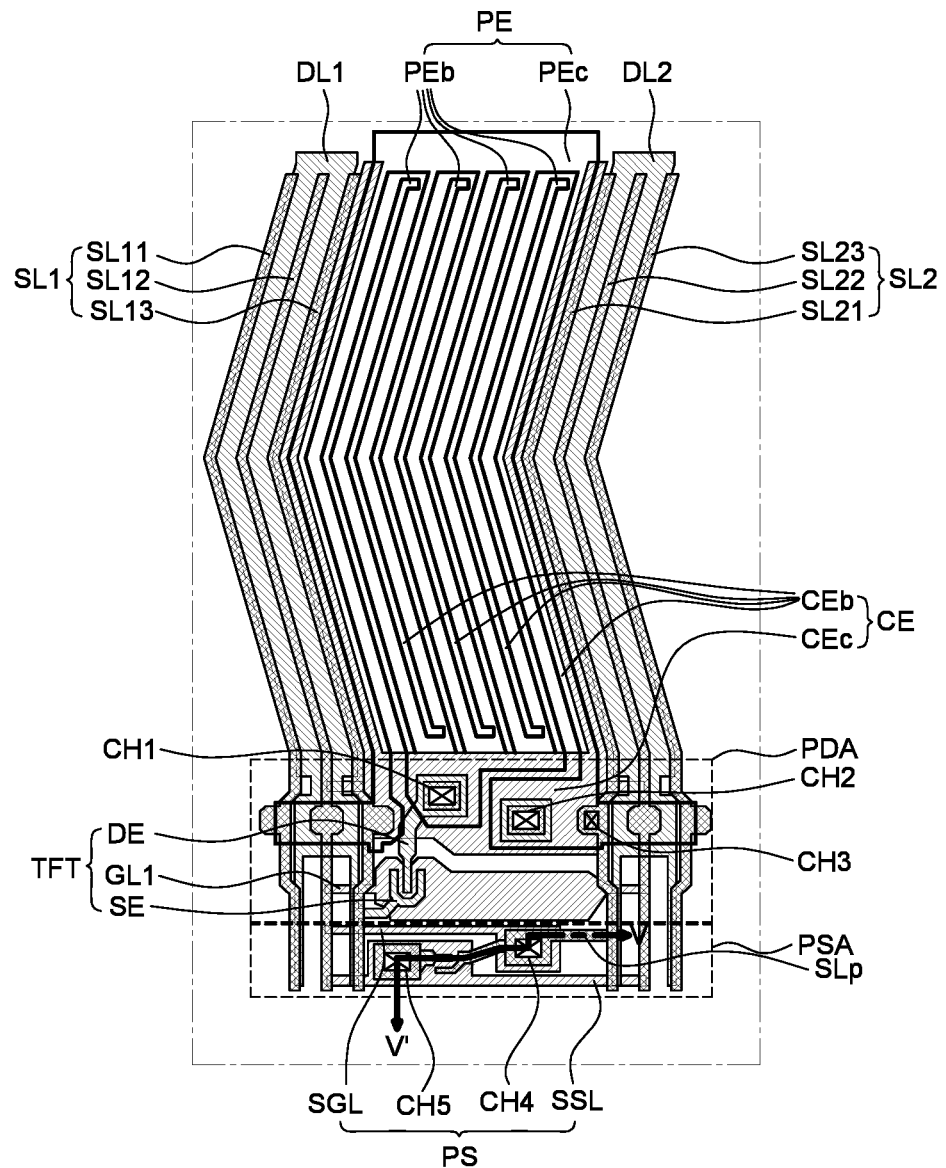
FIG. 6A is a plan view provided to explain a pixel structure in a display device according to another exemplary aspect of the display panel illustrated in FIG. 1.
Figure 6B:
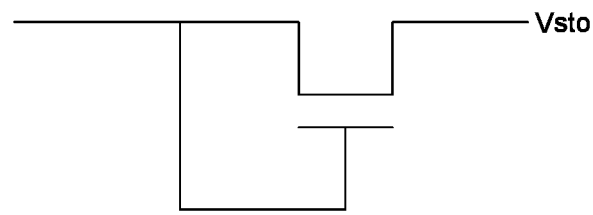
FIG. 6B is a circuit diagram schematically illustrating a photo touch sensor illustrated in FIG. 6A.
Figure 6C:
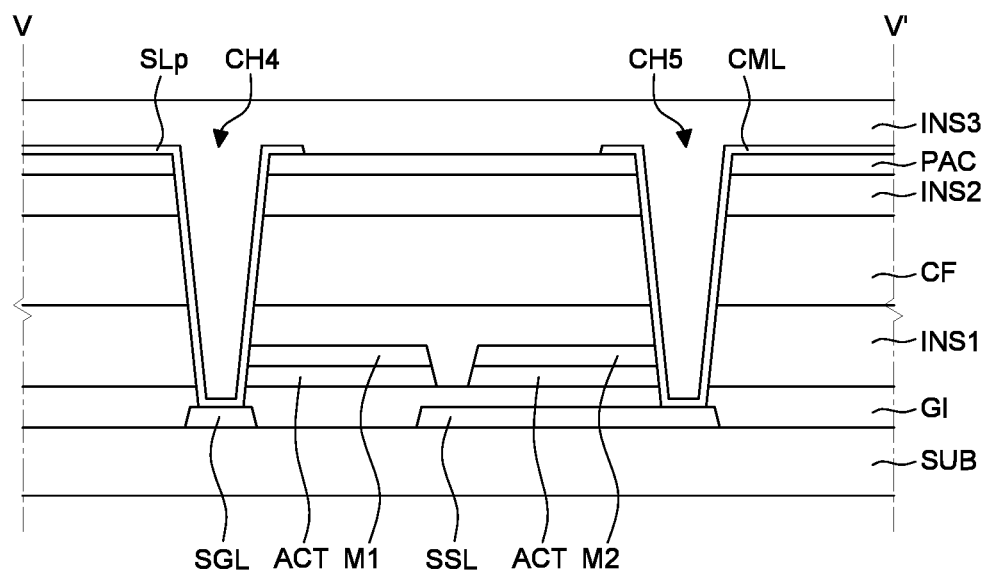
FIG. 6C is a cross-sectional view taken along line V-V' of FIG. 6A.

FIG. 6A is a plan view provided to explain a pixel structure in a display device according to another exemplary aspect of the display panel illustrated in FIG. 1. FIG. 6B is a circuit diagram schematically illustrating a photo touch sensor illustrated in FIG. 6A. FIG. 6C is a cross-sectional view taken along line V-V' of FIG. 6A.

FIG. 6A illustrates the same structure as illustrated in FIG. 4A except for the structure of the photo touch sensor PS disposed in the photo sensing area PSA. Therefore, a detailed description thereof will not be provided.

Referring to FIG. 6A and FIG. 6C, the sensing storage line SSL and the sensing gate line SGL are disposed as spaced from each other in the photo sensing area PSA. Herein, the illustration of the sensing data line SDL is omitted unlike FIG. 4A. FIG. 6A illustrates a photo touch sensor that senses a touch in a current-driven manner, and herein, the sensing storage line SSL and the sensing gate line SGL are connected in a diode manner. Therefore, the sensing data line SDL can be omitted. Meanwhile, the sensing storage line SSL and the sensing gate line SGL are disposed in the first direction in which the gate lines GL are extended and may be disposed in each pixel P. Herein, if the sensing gate line SGL is not disposed in the first direction, the photo touch sensor PS needs to have a contact hole under a plurality of sensing lines for electrical connection with any one of the plurality of sensing lines or dispose a component for direct connection to overlap with the sensing lines. In this case, the contact hole is disposed in an area overlapping with the plurality of sensing lines, which may cause asymmetric capacitance. Thus, it becomes difficult to dispose the data lines DL. However, as described in an exemplary aspect of the present disclosure, the sensing gate line SGL for applying a touch scan signal to the photo touch sensor PS is disposed in the first direction, and, thus, it is possible to form a separate area for the photo touch sensor PS. Therefore, when the photo touch sensor PS is disposed, the degree of freedom in configuration and design among other components can be improved.

The photo touch sensor PS can be connected in a current-driven manner as illustrated in FIG. 6B.

Referring to FIG. 6B, a touch sensing method for the photo touch sensor PS connected in a current-driven manner may use two equations related to the quantity of electric charge Q charged in the capacitor to sense a touch. More specifically, the equation CV=di/dt can be obtained by using the equation Q=C (capacitance of the capacitor) □ V (voltage) and the equation Q=di/dt. Consequently, the equation V=it/C can be obtained.

The photo touch sensor PS is generally applied with the current from the outside by light, and in the common electrode CE, a touch by a finger or the like causes an increase in quantity of electric charge. Since the quantity of electric charge and the current are in inverse proportion to each other according to the above-described equation, the current may be decreased in a touch sensing method using the current. Therefore, as illustrated in FIG. 6B, the photo touch sensor PS is connected in a diode manner. When a touch is sensed, a diode is opened and the current is decreased. By using the time until the voltage reaches a predetermined specific voltage, it is possible to determine whether the touch is sensed by the common electrode CE or the photo touch sensor PS. More specifically, in the photo touch sensor PS, the current is increased, and, thus, the number of counter clocks is small until the voltage reaches the predetermined specific voltage. In the common electrode CE, the current is decreased, and, thus, the number of counter clocks is large until the voltage reaches the predetermined specific voltage. According to the number of counter clocks until the voltage reaches the predetermined specific voltage, it is possible to determine whether the touch is sensed by the common electrode CE or the photo touch sensor PS.

In this way, the display device 100 according to an exemplary aspect of the present disclosure can distinguish touch sensing by the common electrode CE from touch sensing by the photo touch sensor PS during a touch driving period.

Figure 7A:
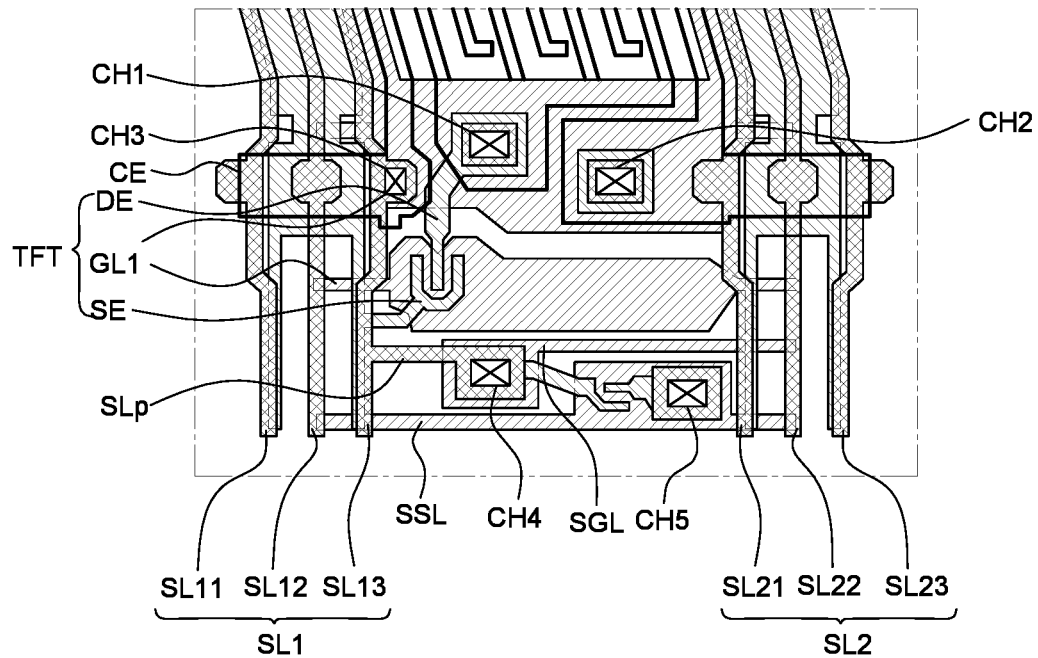
FIG. 7A and FIG. 7B are diagrams illustrating an example of the interconnection between a photo touch sensor and a plurality of sensing lines according to an exemplary aspect of the present disclosure.
Figure 7B:
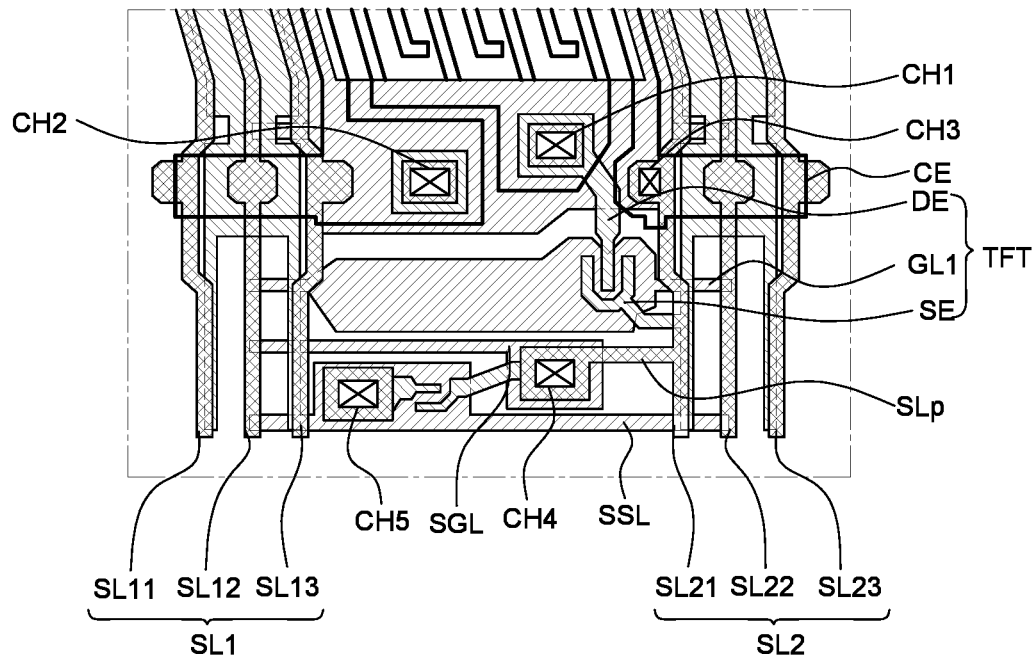

FIG. 7A and FIG. 7B are diagrams illustrating an example of the interconnection between a photo touch sensor and a plurality of sensing lines according to an exemplary aspect of the present disclosure.

Referring to FIG. 7A, the common electrode CE is in contact with and connected to the 2-1 sensing line SL21 of the second sensing line group SL2. Further, the sensing gate line SGL of a photo touch sensor may be in contact with and connected to a sensing line protrusion SLp protruding from the 2-1 sensing line SL21 of the second sensing line group SL2.

As such, the common electrode CE is electrically connected to the 2-1 sensing line SL21 closest to the common electrode in the open area among the second sensing line group SL2. Therefore, it becomes easy to dispose the sensing gate line SGL of the photo touch sensor. In other words, if the 2-3 sensing line SL23 of the second sensing line group SL2 is the outermost sensing line, when the innermost 2-1 sensing line SL21 is connected to the common electrode CE, it becomes easy to dispose the photo touch sensor. If the common electrode CE is in contact with and connected to the 2-2 sensing line SL22 and the 2-3 sensing line SL23 instead of the innermost 2-1 sensing line SL21 among the plurality of sensing lines SL21, SL22, and SL23 of the second sensing line group SL2, the photo touch sensor needs to be connected to the same sensing line. Therefore, in order for the photo touch sensor to be connected to the 2-2 sensing line SL22 and the 2-3 sensing line SL23, a component or contact hole for connection with the 2-2 sensing line SL22 or the 2-3 sensing line SL23 needs to be formed under the 2-2 sensing line SL22 or the 2-3 sensing line SL23. However, in this case, the second sensing line group SL2 is disposed overlapping with the second data lines DL2, and, thus, it may be difficult to form the component or contact hole for electrical connection with the photo touch sensor.

Referring to FIG. 7B, the common electrode CE is in contact with and connected to the 1-3 sensing line SL13 of the first sensing line group SL1. Further, the sensing gate line SGL of the photo touch sensor may be in contact with and connected to a sensing line protrusion SLp protruding from the 1-3 sensing line SL13 of the first sensing line group SL1. Even in the exemplary aspect illustrated in FIG. 7B, the common electrode CE is connected to the 1-3 sensing line SL13 closest to a driving device among the plurality of sensing lines SL11, SL12, and SL13 of the first sensing line group SL1. In this case, it becomes easy to dispose the photo touch sensor.

In order to simultaneously perform touch sensing by the common electrode CE and touch sensing by the photo touch sensor PS, the photo touch sensor PS needs to be easily disposed. In terms of design, it may be difficult to connect the common electrode CE only to sensing lines closest to a driving device among a plurality of sensing lines. Accordingly, the present disclosure suggests the configuration of a photo touch sensor as follows.

Figure 8A:
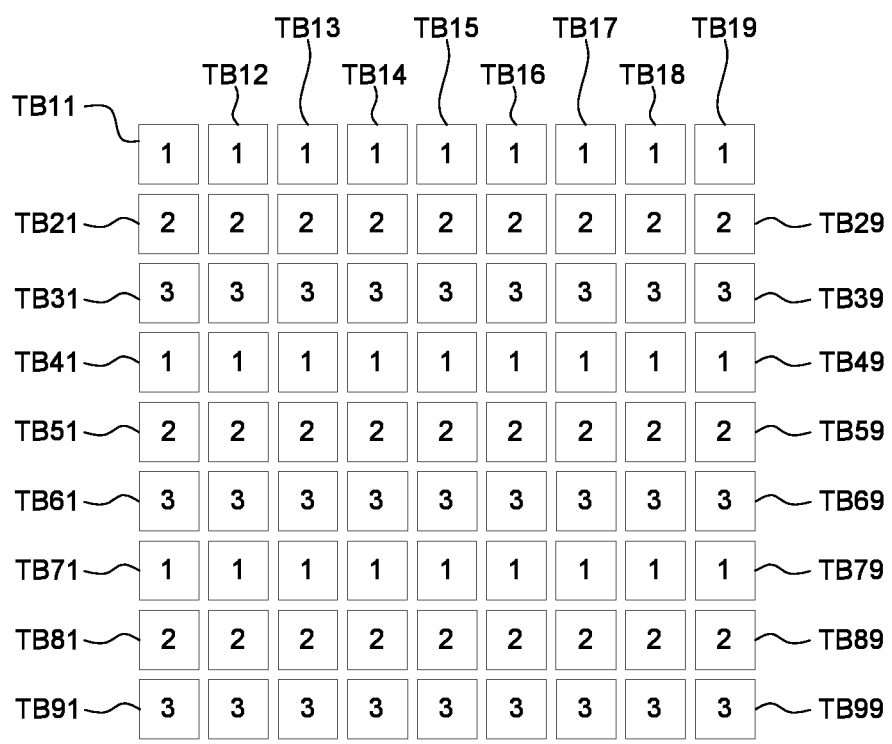
FIG. 8A through FIG. 8C are diagrams provided to explain an example of a configuration of a photo touch sensor in a display device according to an exemplary aspect of the present disclosure.
Figure 8B:
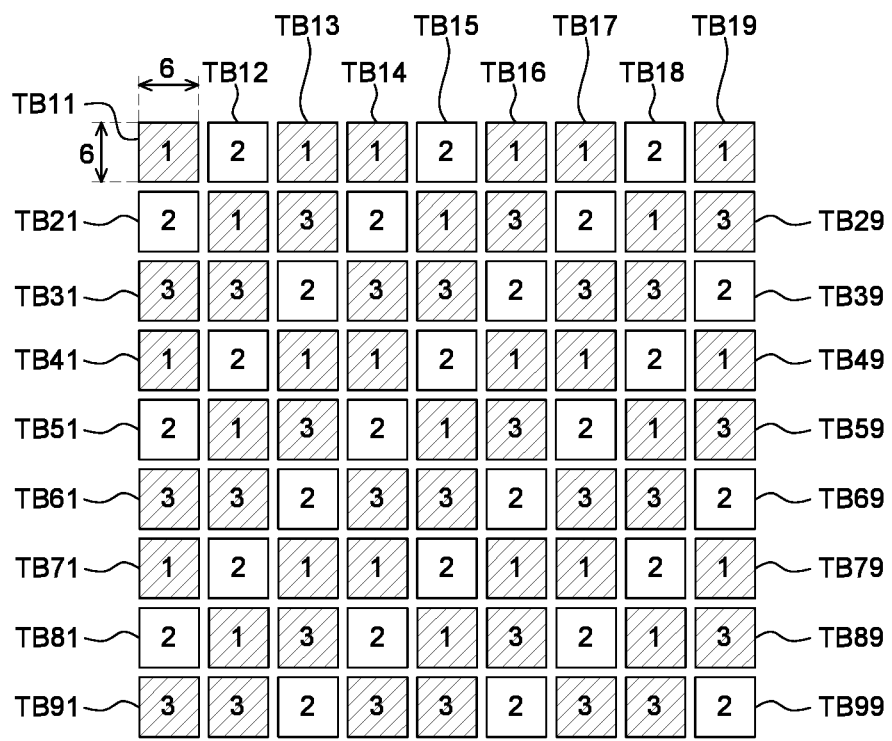
Figure 8C:
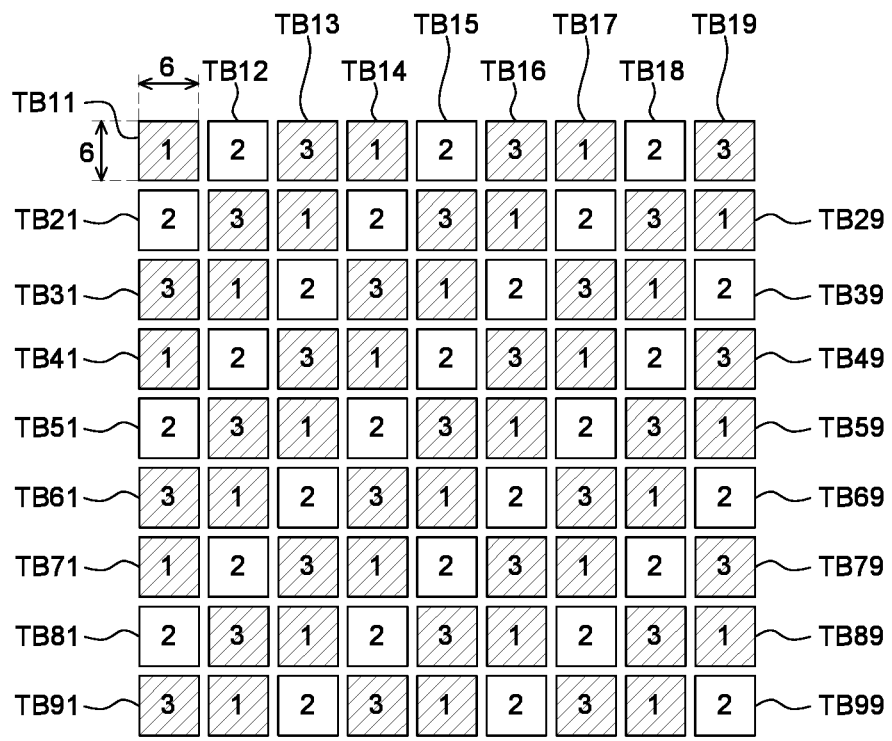
Figure 8C:
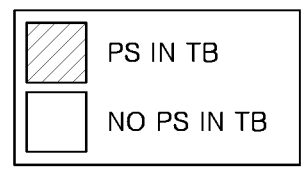

FIG. 8A through FIG. 8C are diagrams provided to explain an example of a configuration of a photo touch sensor in a display device according to an exemplary aspect of the present disclosure.

Prior to referring to FIG. 8A through FIG. 8C, it is to be noted that a square box represents a touch block and the number in each square box shows that common electrodes are connected to a first sensing line, a second sensing line, or a third sensing line among sensing lines forming a sensing line group. For example, if a plurality of sensing line groups includes three sensing lines, i.e., a first sensing line, a second sensing line, and a third sensing line, 1 represents a touch block in which the common electrode is connected to the first sensing line of the sensing line groups, 2 represents a touch block in which the common electrode is connected to the second sensing line of the sensing line groups, and 3 represents a touch block in which the common electrode is connected to the third sensing line of the sensing line groups in FIG. 8A through FIG. 8C.

Referring to FIG. 8A illustrating a design of a typical touch block TB, the photo touch sensor PS is not disposed. In the typical touch block TB, touch blocks TB11 through TB19 in a first row are connected to the first sensing line of the plurality of sensing line groups, touch blocks TB21 through TB29 in a second row are connected to the second sensing line of the plurality of sensing line groups. Further, touch blocks TB31 through TB39 in a third row are connected to the third sensing line of the plurality of sensing line groups. In the typical touch block TB, touch blocks in each row are disposed to be one-to-one connected to the same sensing line.

A photo touch sensor may be disposed in the typical touch block TB as follows.

Referring to FIG. 8B, the touch blocks TB11 through TB19 in the first row are connected to the first sensing line as illustrated in FIG. 8A. Thus, it is easy to dispose a photo touch sensor, and photo touch sensors may be disposed in all of the touch blocks in the first row. However, the touch blocks TB21 through TB29 in the next second row are connected to the second sensing line having difficulty in connecting to a photo touch sensor. Therefore, in some of the touch blocks in the first row, a common electrode may be connected to the second sensing line and a photo touch sensor may not be disposed in consideration of a touch point of each photo touch sensor. For example, in a 1-2 touch block TB12, a 1-5 touch block TB15, and a 1-8 touch block TB18 among the touch blocks TB11 through TB19 in the first row, the common electrode may be connected to the second sensing line, and, thus, the photo touch sensor may not be disposed in the 1-2 touch block TB12, the 1-5 touch block TB15, and the 1-8 touch block TB18. In FIG. 8B, it is described that no photo touch sensor is in a touch block, but the present disclosure is not limited thereto. Photo touch sensors may be disposed in the respective touch blocks TB11 through TB19 in the first row for easiness in configuration, but may not be electrically connected.

Meanwhile, the touch blocks TB21 through TB29 in the second row are connected to the second sensing line. Thus, it is not easy to dispose a photo touch sensor. Even so, if photo touch sensors are not disposed in all of the touch blocks TB21 through TB29 in the second row or not electrically connected, touch sensing by a photo touch sensor cannot be performed in the touch blocks TB21 through TB29 in the second row. Therefore, in an exemplary aspect of the present disclosure, common electrodes in some of the touch blocks TB21 through TB29 in the second row are connected to the first sensing line or the third sensing line and photo touch sensors are disposed in the respective touch blocks in which the common electrodes are connected to the first sensing line or the third sensing line, as illustrated in FIG. 8B. For example, common electrodes disposed in a 2-2 touch block TB22, a 2-3 touch block TB23, a 2-5 touch block TB25, a 2-6 touch block TB26, a 2-8 touch block TB28, and a 2-9 touch block TB29 among the touch blocks TB21 through TB29 in the second row may be connected to the first sensing line or the third sensing line and photo touch sensors may be disposed in the respective blocks. In FIG. 8B, it is described that no photo touch sensor is in a touch block, but the present disclosure is not limited thereto. Photo touch sensors may be disposed in the respective touch blocks TB21 through TB29 in the second row for easiness in configuration, but may not be electrically connected.

Further, the touch blocks TB31 through TB39 in the third row are connected to the third sensing line. Thus, it is easy to dispose a photo touch sensor. Therefore, photo touch sensors may be disposed in all of the touch blocks in the third row. However, the touch blocks TB21 through TB29 in the previous second row are connected to the second sensing line having difficulty in connecting to a photo touch sensor. Therefore, in some of the touch blocks in the third row, photo touch sensors may not be disposed in consideration of a touch point of each photo touch sensor. For example, in a 3-3 touch block TB33, a 3-6 touch block TB36, and a 3-9 touch block TB39 among the touch blocks TB31 through TB39 in the third row, the common electrode may be connected to the second sensing line, and, thus, the photo touch sensor may not be disposed in the 3-3 touch block TB33, the 3-6 touch block TB36, and the 3-9 touch block TB39. Herein, in the touch blocks in which the common electrodes are connected to the second sensing line among the touch blocks TB31 through TB39 in the third row, a photo touch sensor is not disposed. Therefore, photo touch sensors may be set to be disposed in the respective touch blocks in consideration of a touch point of each photo touch sensor. In FIG. 8B, it is described that no photo touch sensor is in a touch block, but the present disclosure is not limited thereto. Photo touch sensors may be disposed in the respective touch blocks TB31 through TB39 in the third row for easiness in configuration, but may not be electrically connected.

As such, in the display device according to an exemplary aspect of the present disclosure, all the touch blocks in each row are not connected to the same sensing line. In the first row and the third row, touch blocks connected to the second sensing line are disposed and in the second row, touch blocks connected to the first sensing line or the third sensing line are disposed. Thus, photo touch sensors can be uniformly disposed. When viewed as a whole, the touch blocks connected to the second sensing line may be disposed diagonally.

Meanwhile, FIG. 8B illustrates that the touch blocks TB11 through TB19 in the first row are connected to the first sensing line as illustrated in FIG. 8A and only some touch blocks are disposed as connected to the second sensing line to dispose a photo touch sensor. However, as illustrated in FIG. 8C, every three touch blocks in all the rows may be connected to different sensing lines, respectively. For example, referring to FIG. 8C, a 1-1 touch block TB11 among the touch blocks TB11 through TB19 in the first row may be connected to the first sensing line, a 1-2 touch block TB12 may be connected to the second sensing line and a 1-3 touch block TB13 may be connected to the third sensing line. Further, a 2-1 touch block TB21 among the touch blocks TB21 through TB29 in the previous second row may be connected to the second sensing line, a 2-2 touch block TB22 may be connected to the third sensing line and a 2-3 touch block TB23 may be connected to the first sensing line. Herein, in the touch blocks connected to the second sensing line, a photo touch sensor is not disposed. Therefore, photo touch sensors may be set to be disposed in the respective touch blocks in consideration of a touch point of each photo touch sensor. That is, as illustrated in FIG. 8B, the touch blocks connected to the second sensing line among all of the touch blocks in the display device may be disposed as extended diagonally.

As described above with reference to FIG. 8B and FIG. 8C, it is not easy for touch blocks, which are connected to the second sensing line among the sensing lines connected to each touch block, to be connected to a photo touch sensor. Therefore, in the touch blocks connected to the second sensing line, a photo touch sensor is not disposed or not electrically connected. Thus, a touch block and a photo sensing block defined by a photo touch sensor can be designed to have the same size. That is, as illustrated in FIG. 8B and FIG. 8C, if a touch block is designed as a 6 mm square, a photo sensing block defined by a photo touch sensor can also be designed as a 6 mm square.

However, the present disclosure is not limited thereto. The touch block in which a touch is sensed by a common electrode may be designed to have a different size from the photo sensing block in which a touch is sensed by a photo touch sensor.

Particularly, the display device according to an exemplary aspect of the present disclosure as illustrated in FIG. 8A through FIG. 8C includes touch blocks in which a photo touch sensor is not disposed or not electrically connected. Thus, there may be a period in which touch sensing by a photo touch sensor is not performed, which may cause degradation of touch characteristics. Even if photo touch sensors are disposed in consideration of a touch point of each photo touch sensor in the display device according to an exemplary aspect of the present disclosure, the touch characteristics may be not much degraded. The present disclosure suggests the following method to minimize such concern.

Figure 9A:
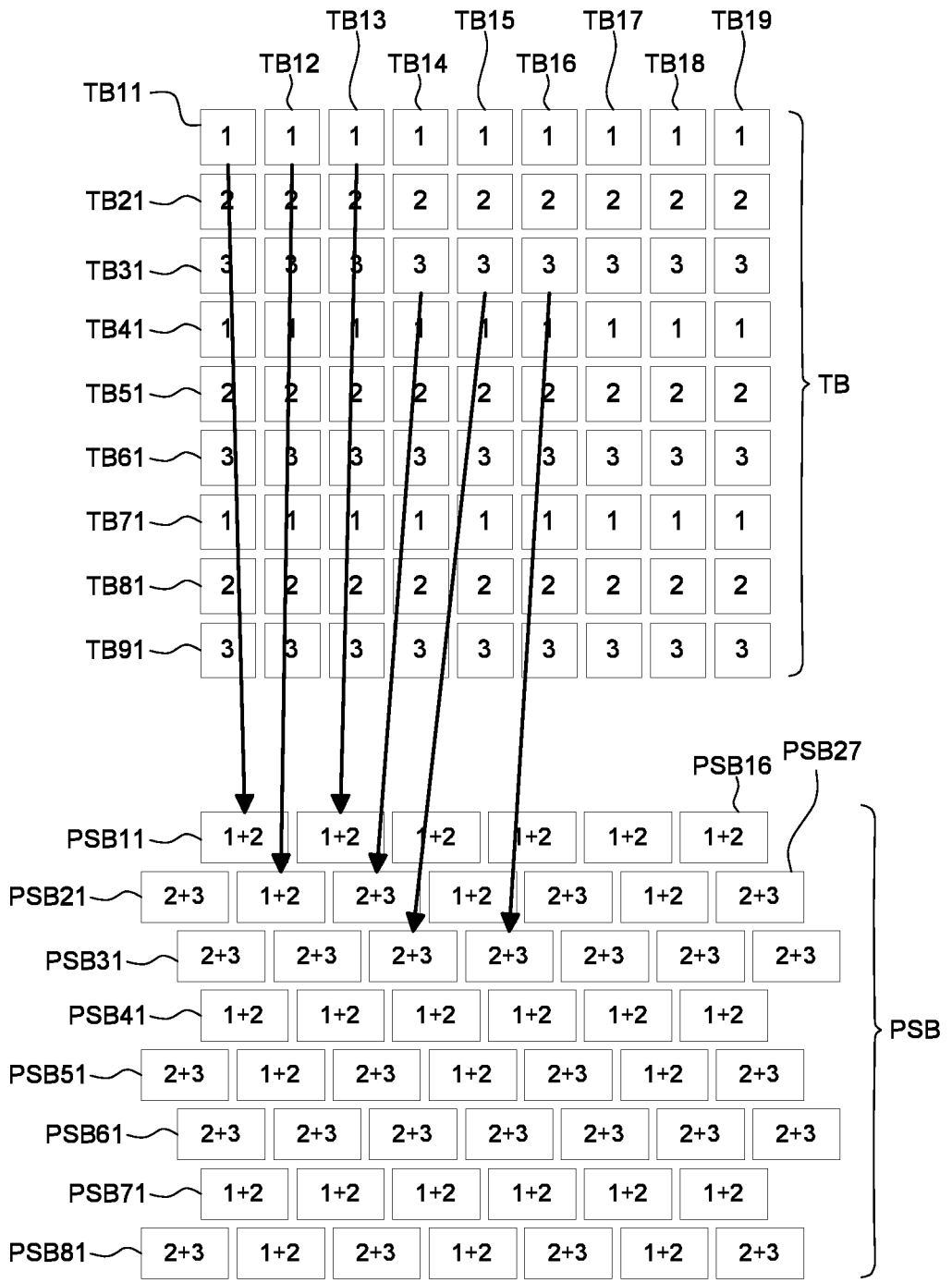
FIG. 9A and FIG. 9B are diagrams provided to explain another example of a configuration of a photo touch sensor in a display device according to an exemplary aspect of the present disclosure.
Figure 9B:
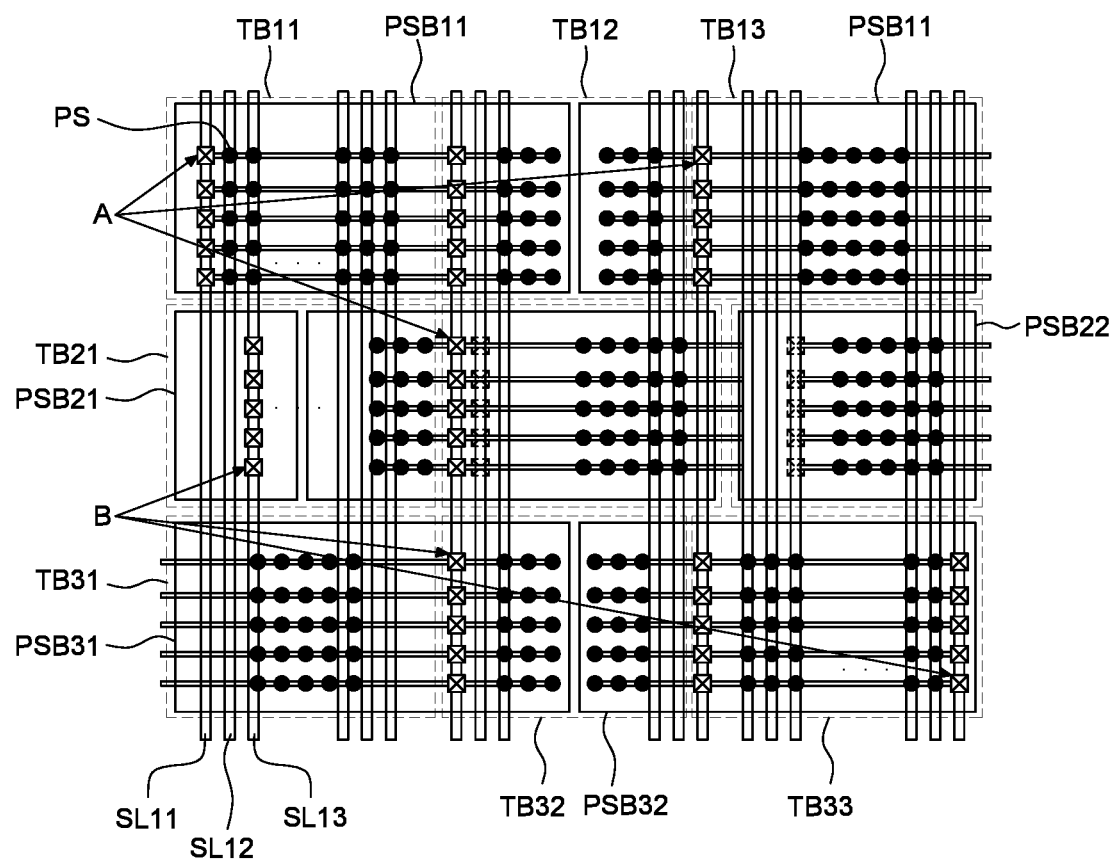

FIG. 9A and FIG. 9B are diagrams provided to explain another example of a configuration of a photo touch sensor in a display device according to an exemplary aspect of the present disclosure.

Unlike FIG. 8B and FIG. 8C, FIG. 9A illustrates a method of designing photo touch sensors to be disposed in all of the respective touch blocks TB illustrated in FIG. 8A. If a block in which a photo touch sensor is disposed is referred to as a photo sensing block PSB, the photo sensing block PSB is defined by merging a touch block connected to the first sensing line or the third sensing line with a part of a touch block connected to the second sensing line. For example, a first photo sensing block PSB11 may be defined by merging the 1-1 touch block TB11 connected to the first sensing line with the 2-1 touch block TB21 connected to the second sensing line. Further, a 2-1 photo sensing block PSB21 may be defined by merging the remaining part of the 2-1 touch block TB21 with the 3-1 touch block TB31. The touch blocks TB are electrically connected to the common electrode. The photo touch sensor according to the present disclosure is connected to the sensing gate line disposed in the first direction. Therefore, it is possible to set the touch sensing block PSB differently from the touch block TB. Therefore, in the display device according to another exemplary aspect of the present disclosure, a designed touch block TB may have a different size from a photo sensing block PSB. For example, a touch block TB may be a 6 mm square and a photo sensing block PSB may be a 9-6 mm rectangle.

Since a photo sensing block PSB can be designed as a rectangle, photo sensing blocks PSB may be disposed in a zigzag pattern as illustrated in FIG. 9A and FIG. 9B.

Referring to FIG. 9B in detail, in the typical touch block TB, a 1-1 photo sensing block PSB11 in which a photo touch sensor PS is disposed may be designed by merging the 1-1 touch block TB11 in the first row with a part of the 2-2 touch block TB22 in the second row to be connected to the first sensing line. Further, a 1-2 photo sensing block PSB12 in which a photo touch sensor PS is disposed may be designed by merging the remaining part of the 2-2 touch block TB22 in the second row with the 1-3 touch block TB13 in the first row to be connected to the first sensing line. Furthermore, a 3-1 photo sensing block PSB31 in which a photo touch sensor PS is disposed may be designed by merging a part of the 2-1 touch block TB21 with the 3-2 touch block TB32 to be connected to the third sensing line, and a 3-2 photo sensing block PSB32 in which a photo touch sensor PS is disposed may be designed by merging the remaining part of the 2-1 touch block TB21 with the 3-3 touch block TB33 to be connected to the third sensing line. In FIG. 9B, the 1-1 touch block TB11, the 1-3 touch block TB13, and the 2-2 touch block TB22 may be in contact with and connected to the first sensing line as indicated by A and the 2-1 touch block TB21, the 3-2 touch block TB32, and the 3-3 touch block TB33 may be in contact with and connected to the third sensing line as indicated by B. Herein, in the design illustrated in FIG. 9B, at least one of the outermost sensing blocks PSB, e.g., the 2-1 photo sensing block PSB may have a different size from the other photo sensing blocks PSB. That is, as illustrated in FIG. 9B, the 2-1 photo sensing block PSB21 may have a smaller size than the adjacent 2-2 photo sensing block PSB22.

If a touch block is set as such, photo touch sensors PS can be disposed in all of touch blocks, respectively. Also, touch sensing by the touch blocks and touch sensing by the photo touch sensors can be performed simultaneously.

The exemplary aspects of the present disclosure can also be described as follows.

According to an aspect of the present disclosure, a display device may include a pixel electrode and a common electrode disposed in an open area, a gate line disposed as extended in a first direction in a non-open area surrounding the open area and configured to transmit a gate signal to the pixel electrode, a data line disposed as extended in a second direction different from the first direction in the non-open area and configured to transmit a data signal to the pixel electrode, a plurality of sensing lines disposed in the non-open area and configured to transmit a common voltage or a touch scan signal to the common electrode and a photo touch sensor disposed in the non-open area and electrically connected to any one of the plurality of sensing lines.

The photo touch sensor may include a sensing gate line electrically connected to the electrically connected sensing line among the plurality of sensing lines and a sensing storage line disposed as spaced from the sensing gate line.

The sensing line connected to the sensing gate line may be electrically connected to the common electrode.

The sensing line connected to the sensing gate line and the common electrode may be disposed closest to the common electrode among the plurality of sensing lines.

The sensing gate line may be extended in the same direction as the first direction.

The sensing gate line and the sensing storage line may be connected in a diode manner.

The photo touch sensor may further include a sensing data line configured to be applied with a sensor driving voltage from the outside.

The sensor driving voltage applied to the sensing data line may have a higher level than a voltage applied to the common electrode.

At least one of the plurality of sensing lines may be disposed to fully overlap with the data line and another one of the plurality of sensing lines may be disposed to partially overlap with the data line.

The common electrode may be applied with a common voltage from the plurality of sensing lines during a display driving period and is applied with a touch scan signal from the plurality of sensing lines during a touch driving period.

When the common electrode may be applied with the touch scan signal during the touch driving period, the photo touch sensor may be also applied with a touch scan signal.

According to an another aspect of the present disclosure, a display device may include common electrodes configured to generate an electric field with pixel electrodes when applied with a common voltage during a display driving period and sense a touch when applied with a touch scan signal during a touch driving period, a plurality of touch blocks disposed by grouping the common electrodes, a plurality of sensing lines disposed corresponding to each of the plurality of touch blocks and a plurality of photo sensing blocks in which a photo touch sensor configured to sense a touch during the touch driving period is disposed, wherein each of the plurality of touch blocks is electrically connected to any one of the plurality of sensing lines, and the plurality of photo sensing blocks is disposed along the positions of the sensing lines connected to the respective touch blocks.

Each of the plurality of touch blocks may have the same size as each of the plurality of photo sensing blocks.

The photo sensing block may be set corresponding to a first touch block electrically connected to a sensing line adjacent to the common electrode among the plurality of touch blocks and is set not corresponding to a second touch block electrically connected to a sensing line which is not adjacent to the common electrode among the plurality of touch blocks.

Each of the plurality of touch blocks may have a different size from each of the plurality of photo sensing blocks.

Each of the plurality of photo sensing blocks may be defined by merging a first touch block electrically connected to a sensing line adjacent to the common electrode among the plurality of touch blocks with a part of a second touch block connected to a sensing line which is not adjacent to the common electrode among the plurality of touch blocks.

At least one of the outermost photo sensing blocks among the plurality of photo sensing blocks may have a different size from the other photo sensing blocks.

The photo touch sensor may be connected to a sensing line adjacent to the common electrode among the plurality of sensing lines through a sensing line protrusion protruding from the sensing line.

The photo touch sensor may include a sensing gate line connected to the sensing line protrusion.

The display device may further comprise a gate line configured to apply a gate signal to the pixel electrodes and extended in a first direction and a data line configured to apply a data signal to the pixel electrodes and extended in a direction different from the first direction, wherein the sensing gate line is disposed as extended in the first direction.

The sensing gate line does not overlap with the data line.

At least one of the plurality of sensing lines may be disposed to fully overlap with the data line and another one of the plurality of sensing lines is disposed to partially overlap with the data line.

Although the exemplary aspects of the present disclosure have been described in detail with reference to the accompanying drawings, the present disclosure is not limited thereto and may be embodied in many different forms without departing from the technical concept of the present disclosure. Therefore, the exemplary aspects of the present disclosure are provided for illustrative purposes only but not intended to limit the technical concept of the present disclosure. The scope of the technical concept of the present disclosure is not limited thereto. Therefore, it should be understood that the above-described exemplary aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device having an open area and a non-open area surrounding the open area, comprising:
    a pixel electrode and a common electrode disposed in the open area;
    a gate line disposed to extend in a first direction in the non-open area surrounding the open area and transmitting a gate signal to the pixel electrode;
    a data line disposed to extend in a second direction in the non-open area and transmitting a data signal to the pixel electrode;
    a plurality of sensing lines disposed in the non-open area and transmitting a common voltage or a touch scan signal to the common electrode; and
    a photo touch sensor disposed in the non-open area and electrically connected to one of the plurality of sensing lines,
    wherein the common electrode generates an electric field with the pixel electrode when the common voltage is received from the sensing line and senses a touch when the touch scan signal is received from the sensing line,
    wherein the sensing line electrically connected to the photo touch sensor is disposed adjacent to the common electrode and electrically connected to the common electrode and a sensing gate line of the photo touch sensor, and
    wherein the sensing gate line is electrically connected to the sensing line through a sensing line protrusion protruding from the sensing line.

2. The display device according to claim 1, wherein the photo touch sensor further includes
    a sensing storage line disposed to space apart from the sensing gate line.

3. The display device according to claim 1, wherein the sensing line connected to the sensing gate line and the common electrode is disposed in a closest distance from the common electrode among the plurality of sensing lines.

4. The display device according to claim 1, wherein the sensing gate line is extended to the same direction as the first direction.

5. The display device according to claim 4, wherein the sensing gate line and the sensing storage line are connected in a diode manner.

6. The display device according to claim 2, wherein the photo touch sensor further includes a sensing data line receiving a sensor driving voltage from outside.

7. The display device according to claim 6, wherein the sensor driving voltage applied to the sensing data line has a higher level than a voltage applied to the common electrode.

8. The display device according to claim 1, wherein at least one of the plurality of sensing lines is disposed to entirely overlap the data line and one of the plurality of sensing lines other than at least one of the plurality of sensing lines is disposed to partially overlap the data line.

9. The display device according to claim 1, wherein the common electrode is applied with a common voltage from the plurality of sensing lines during a display driving period and is applied with a touch scan signal from the plurality of sensing lines during a touch driving period.

10. The display device according to claim 9, wherein the photo touch sensor is applied with a touch scan signal when the common electrode is applied with the touch scan signal during the touch driving period.

11. A display device, comprising:
    a plurality of common electrodes configured to generate an electric field with a plurality of pixel electrodes when a common voltage is received during a display driving period and sense a touch when a touch scan signal is received during a touch driving period;

a plurality of touch blocks disposed by grouping the plurality of common electrodes;

a plurality of sensing lines disposed corresponding to each of the plurality of touch blocks; and a plurality of photo sensing blocks in which a photo touch sensor configured to sense a touch during the touch driving period is disposed, wherein each of the plurality of touch blocks is electrically connected to one of the plurality of sensing lines, wherein the photo touch sensor is connected to a sensing line adjacent to the common electrode among the plurality of sensing lines through a sensing line protrusion protruding from the sensing line, and wherein the photo touch sensor includes a sensing gate line connected to the sensing line protrusion.

12. The display device according to claim 11, wherein each of the plurality of touch blocks has the same size as each of the plurality of photo sensing blocks.

13. The display device according to claim 12, wherein each of the photo sensing blocks is disposed to correspond to a first touch block electrically connected to a sensing line adjacent to the common electrode among the plurality of touch blocks and is disposed not correspond to a second touch block electrically connected to a sensing line which is not adjacent to the common electrode among the plurality of touch blocks.

14. The display device according to claim 11, wherein each of the plurality of touch blocks has a different size from each of the plurality of photo sensing blocks.

15. The display device according to claim 14, wherein each of the plurality of photo sensing blocks is defined by merging a first touch block electrically connected to a sensing line adjacent to the common electrode among the plurality of touch blocks with a part of a second touch block connected to a sensing line which is not adjacent to the common electrode among the plurality of touch blocks.

16. The display device according to claim 15, wherein at least one of an outermost photo sensing blocks among the plurality of photo sensing blocks has a different size from other photo sensing blocks.

17. The display device according to claim 11, further comprising a gate line transmitting a gate signal to the plurality of pixel electrodes and is extended in a first direction and a data line transmitting a data signal to the plurality of pixel electrodes and is extended in a direction different from the first direction, wherein the sensing gate line is extended in the first direction.

18. The display device according to claim 17, wherein the sensing gate line does not overlap the data line.

19. The display device according to claim 17, wherein at least one of the plurality of sensing lines is disposed to entirely overlap the data line and another one of the plurality of sensing lines is disposed to partially overlap the data line.

* * * * *